(12) United States Patent
Murota et al.

(10) Patent No.: US 8,725,376 B2
(45) Date of Patent: May 13, 2014

(54) VEHICLE

(75) Inventors: Naoki Murota, Shizuoka (JP); Hiroyuki Fujimoto, Shizuoka (JP); Hiroshi Kawamura, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 794 days.

(21) Appl. No.: 12/758,075

(22) Filed: Apr. 12, 2010

(65) Prior Publication Data

US 2010/0262347 A1 Oct. 14, 2010

(30) Foreign Application Priority Data

Apr. 13, 2009 (JP) ................................. 2009-097206

(51) Int. Cl.
*G06F 19/00* (2011.01)

(52) U.S. Cl.
USPC .............. 701/69; 180/247; 180/250; 180/248

(58) Field of Classification Search
USPC ......... 701/69, 89; 74/469–566; 180/247, 250, 180/248, 233
See application file for complete search history.

(56) References Cited

U.S. PATENT DOCUMENTS

| | | | | |
|---|---|---|---|---|
| 5,005,663 A * | 4/1991 | Niide et al. | ..... | 180/247 |
| 5,092,188 A * | 3/1992 | Fujikawa et al. | ..... | 74/335 |
| 5,275,254 A * | 1/1994 | Shiraishi et al. | ..... | 180/248 |
| 5,839,084 A * | 11/1998 | Takasaki et al. | ..... | 701/67 |
| 5,897,601 A * | 4/1999 | Suzuki | ..... | 701/78 |
| 5,947,858 A * | 9/1999 | Williams | ..... | 475/206 |
| 6,152,848 A * | 11/2000 | Williams et al. | ..... | 475/204 |
| 6,174,255 B1 * | 1/2001 | Porter et al. | ..... | 475/84 |
| 6,976,553 B1 * | 12/2005 | Dahl et al. | ..... | 180/247 |
| 7,090,045 B2 * | 8/2006 | Okada et al. | ..... | 180/242 |
| 7,147,076 B2 * | 12/2006 | Izumi | ..... | 180/250 |
| 7,162,346 B2 * | 1/2007 | Berry et al. | ..... | 701/48 |
| 7,309,289 B2 * | 12/2007 | Kunii et al. | ..... | 464/23 |
| 7,690,468 B2 * | 4/2010 | Nozaki et al. | ..... | 180/247 |
| 8,256,559 B2 * | 9/2012 | Kato et al. | ..... | 180/248 |
| 2002/0070066 A1 * | 6/2002 | Nakamura | ..... | 180/249 |
| 2002/0187874 A1 * | 12/2002 | Kazaoka et al. | ..... | 475/231 |
| 2003/0045393 A1 * | 3/2003 | Yoshioka et al. | ..... | 477/36 |
| 2004/0267427 A1 * | 12/2004 | Suzuki et al. | ..... | 701/69 |
| 2007/0051552 A1 * | 3/2007 | Reed | ..... | 180/333 |
| 2007/0068328 A1 * | 3/2007 | Suzuki | ..... | 74/523 |

(Continued)

FOREIGN PATENT DOCUMENTS

| | | | |
|---|---|---|---|
| JP | 61-244627 A | | 10/1986 |
| JP | 08-085355 A | | 4/1996 |

(Continued)

*Primary Examiner* — Thomas Black
*Assistant Examiner* — Sara Nelson
(74) *Attorney, Agent, or Firm* — Keating & Bennett, LLP

(57) ABSTRACT

A vehicle can be operated in a first drive mode in which a front differential is set to a non-driven state and a rear differential is set to a differential state, a second drive mode in which the front differential is set to a non-driven state and the rear differential is set to a differential locked state, a third drive mode in which the front differential is set to a differential state and the rear differential is set to a differential locked state, and a fourth drive mode in which the front differential is set to a differential locked state and the rear differential is set to a differential locked state. Transition is allowed only between adjacent drive modes.

20 Claims, 27 Drawing Sheets

(56) References Cited

U.S. PATENT DOCUMENTS

| | | |
|---|---|---|
| 2007/0163376 A1* | 7/2007 | Baldet ................ 74/473.31 |
| 2007/0235242 A1* | 10/2007 | Nozaki et al. ............ 180/247 |
| 2007/0282512 A1* | 12/2007 | Hoeck et al. ............... 701/71 |
| 2010/0093482 A1* | 4/2010 | Allmendinger et al. ..... 475/234 |
| 2010/0139435 A1* | 6/2010 | Inagaki ................. 74/473.3 |
| 2010/0250049 A1* | 9/2010 | Nihei et al. ............... 701/29 |

FOREIGN PATENT DOCUMENTS

| | | |
|---|---|---|
| JP | 2001-080385 A | 3/2001 |
| JP | 2002-172951 A | 6/2002 |
| JP | 2007-062607 A | 3/2007 |
| JP | 2007-113650 A | 5/2007 |
| JP | 2007-269148 A | 10/2007 |
| JP | 2007-331510 A | 12/2007 |

* cited by examiner

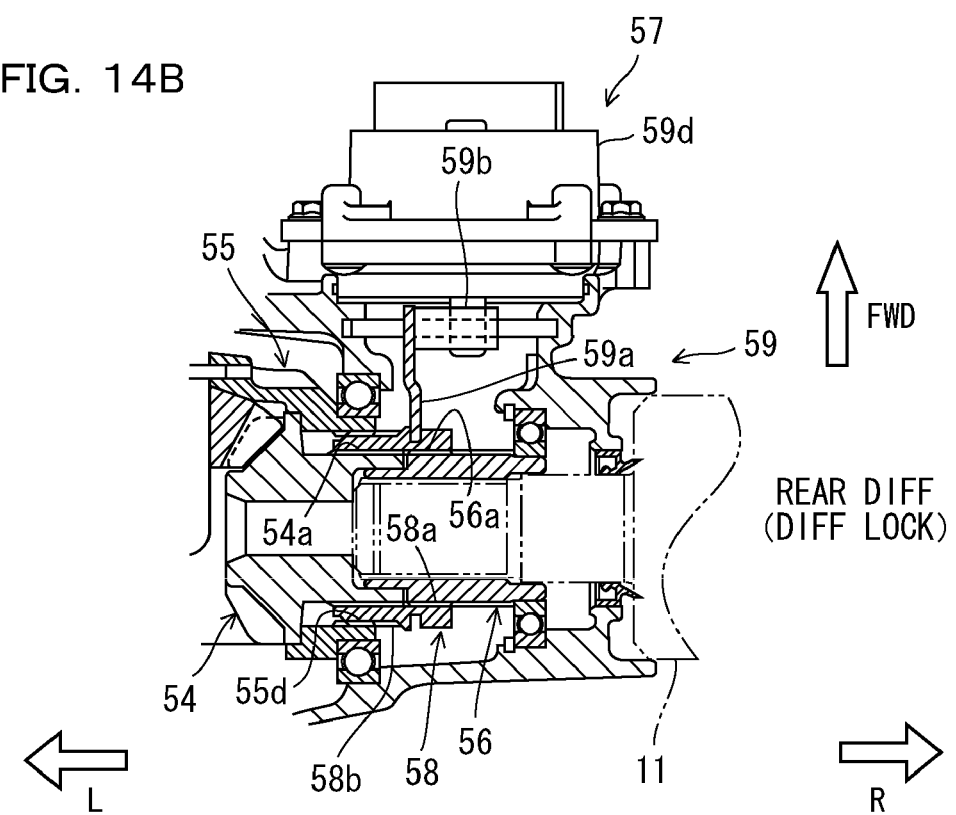

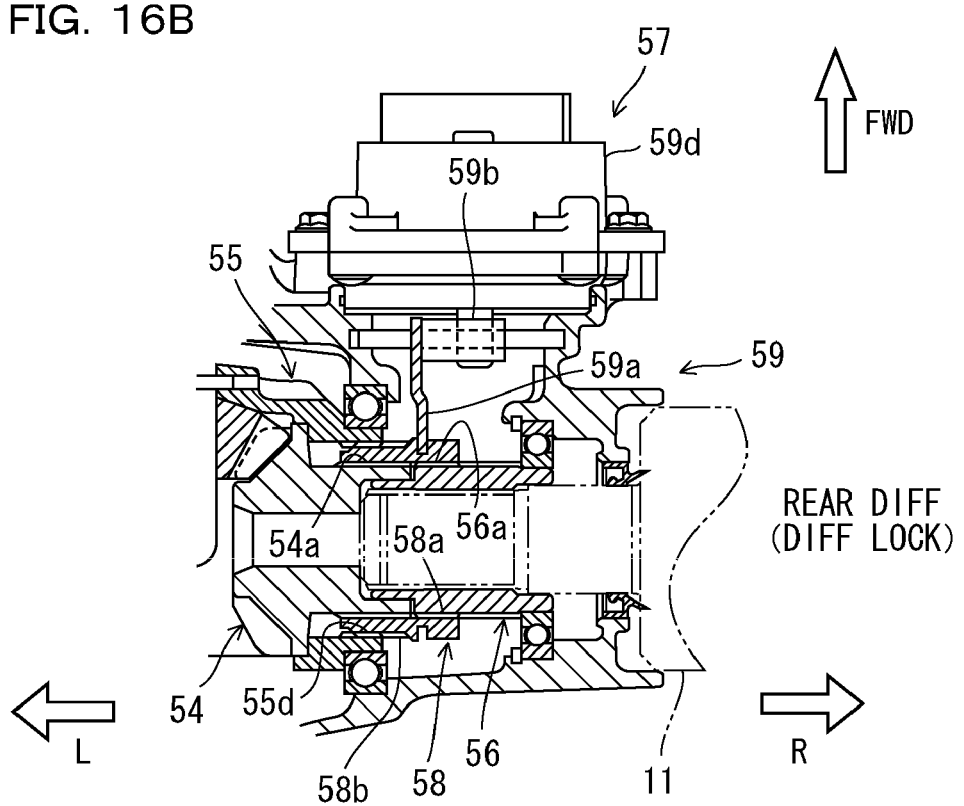

1ST DRIVE MODE    2ND DRIVE MODE    3RD DRIVE MODE    4TH DRIVE MODE

| SW mode | DIFF UNLOCK | 2WD | 4WD | DIFF LOCK |
|---|---|---|---|---|
| CONTROL SIWTCH 47g | OFF | OFF | OFF | ON |
| CONTROL SWITCH 47h | ON | ON | OFF | OFF |
| CONTROL SWITCH 59g | ON | OFF | OFF | OFF |

VEHICLE

BACKGROUND OF THE INVENTION

1. Field of the Invention

The present invention relates to a vehicle capable of transmitting a driving force of an engine to front wheels through a front differential and to rear wheels through a rear differential. The present invention more specifically relates to a vehicle including a drive mode switch that switches the states of the front differential and the rear differential.

2. Description of the Background Art

Differentials transmit the driving force of an engine to the left and right wheels of the vehicle. Some vehicles include a differential switching mechanism used to switch the transmission states of the differentials. Such a vehicle can travel in a plurality of drive modes by switching the transmission states of the differentials. The driver can switch the drive mode by operating the selecting switch.

Such a vehicle is disclosed in U.S. Pat. No. 6,976,553 as having first to third drive modes.

In the first drive mode, the driving force of the engine is transmitted to the left and right front wheels while the rotation speed difference between the left and right front wheels is eliminated through adjustment. In the first drive mode, the driving force of the engine is transmitted to the left and right rear wheels so that the left and right rear wheels rotate approximately at the same rotation speed.

In the second drive mode, the driving force of the engine is transmitted only to the rear wheels. In the second drive mode, the driving force of the engine is transmitted to the left and right rear wheels so that the left and right rear wheels rotate approximately at the same rotation speed.

In the third drive mode, the driving force of the engine is transmitted only to the rear wheels. In the third drive mode, the driving force of the engine is transmitted to the left and right rear wheels while the rotation speed difference between the left and right rear wheels is eliminated through adjustment.

SUMMARY OF THE INVENTION

A vehicle according to a preferred embodiment of the invention includes a front differential arranged to transmit the driving force of an engine to left and right front wheels, a rear differential arranged to transmit the driving force of the engine to left and right rear wheels, a front switch arranged to switch the coupling state of the front differential, a rear switch arranged to switch the coupling state of the rear differential, and a controller arranged and programmed to control the front switch and the rear switch. The controller is arranged and programmed to set the vehicle to one of first to fourth drive modes. In the first drive mode, the front differential is set to a non-driven state in which the driving force of the engine is not transmitted to the left and right front wheels and the rear differential is set to a differential state in which the driving force of the engine is transmitted to the left and right rear wheels while the rotation speed difference between the left and right rear wheels is eliminated through adjustment. In the second drive mode, the front differential is set to a non-driven state in which the driving force of the engine is not transmitted to the left and right front wheels and the rear differential is set to a differential locked state in which the driving force of the engine is transmitted to the left and right rear wheels so that the left and right rear wheels rotate approximately at the same rotation speed. In the third drive mode, the front differential is set to a differential state in which the driving force of the engine is transmitted to the left and right front wheels while the rotation speed difference between the left and right front wheels is eliminated through adjustment and the rear differential is set to a differential locked state in which the driving force of the engine is transmitted to the left and right rear wheels so that the left and right rear wheels rotate approximately at the same rotation speed. In the fourth drive mode, the front differential is set to a differential locked state in which the driving force of the engine is transmitted to the left and right front wheels so that the left and right front wheels rotate approximately at the same rotation speed and the rear differential is set to a differential locked state in which the driving force of the engine is transmitted to the left and right rear wheels so that the left and right rear wheels rotate approximately at the same speed. Transition is allowed only to the second drive mode from the first drive mode. Transition is allowed only to the first or third drive mode from the second drive mode. Transition is allowed only to the second or fourth drive mode from the third drive mode. Transition is allowed only to the third drive mode from the fourth drive mode.

The driver can select a drive mode among various drive modes depending on the land form or the state of the road. Since the drive mode is switched to an adjacent drive mode sequentially, and therefore the switching operation of the differentials can be carried out smoothly.

Other features, elements, steps, characteristics and advantages of the present invention will become more apparent from the following detailed description of the preferred embodiments of the present invention with reference to the attached drawings.

BRIEF DESCRIPTION OF THE DRAWINGS

FIG. 14B is a view of a coupling state of the rear differential in the second drive mode.

FIG. 16B is a view of a coupling state of the rear differential in the fourth drive mode.

DETAILED DESCRIPTION OF THE PREFERRED EMBODIMENTS

First Preferred Embodiment

Figure 1:
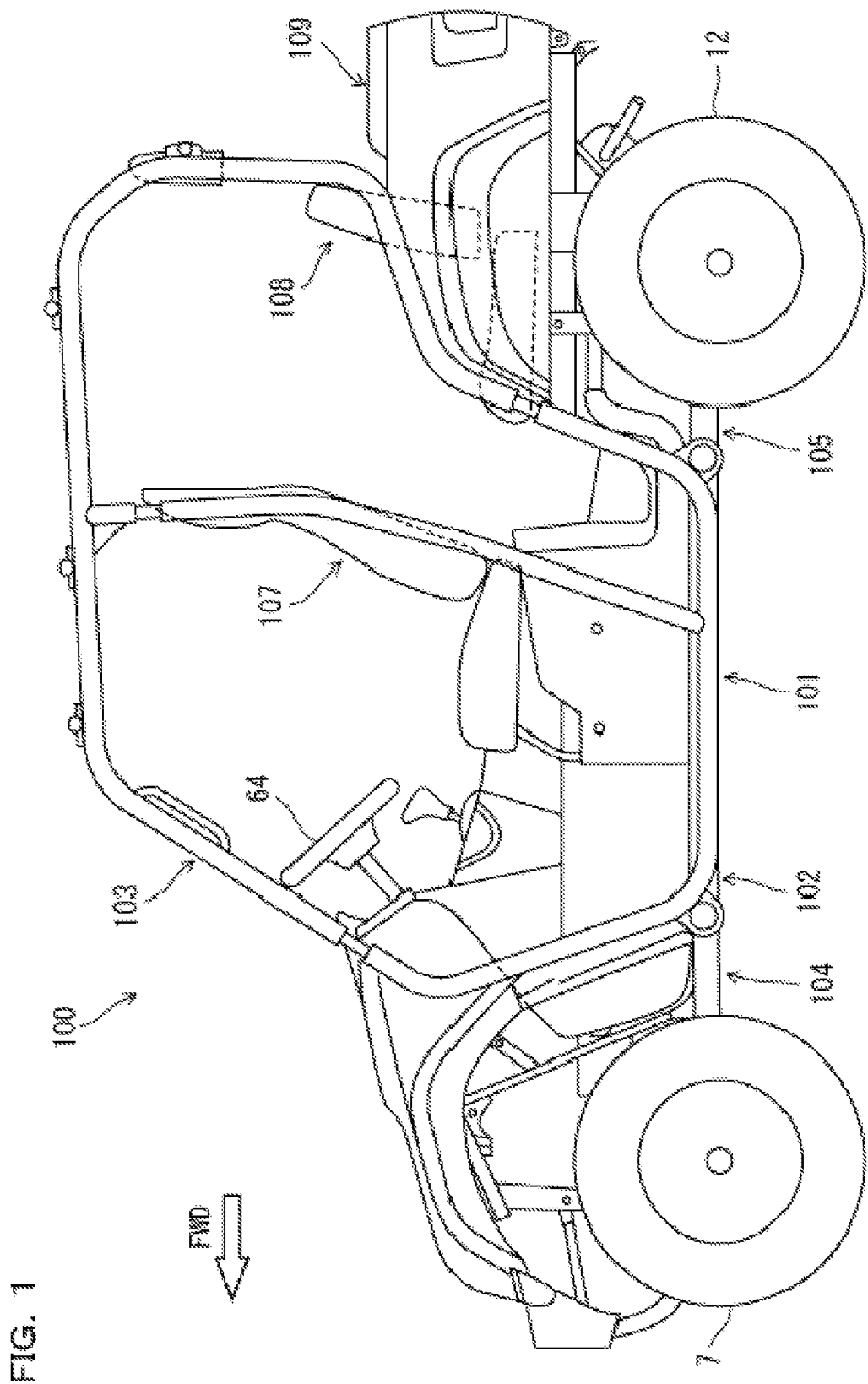
FIG. 1 is a left side view of a vehicle according to a first preferred embodiment of the present invention.

Now, a first preferred embodiment of the present invention will be described in conjunction with the accompanying drawings. FIG. 1 is a left side view of an off-road vehicle 100 (hereinafter simply referred to as the "vehicle 100") according to the first preferred embodiment of the present invention. In the drawings, the arrow FWD indicates the forward in the advancing direction of the vehicle 100. In the following description, the front-back direction and the right-left direction refer to these directions with respect to the advancing direction of the vehicle unless otherwise specified. More specifically, the front direction seen from a driver on the seat indicates the front direction of the vehicle 100 and the right-left direction seen from the driver on the seat is the right-left direction of the vehicle 100. The vehicle width-wise direction is the same direction as the right-left direction.

As shown in FIG. 1, an under frame 102 is provided in a lower portion of the vehicle 100. Roof frames 103 are provided on left and right sides of the under frame 102. The roof frames 103 each have a portion that extends in the vertical direction and a portion that extends in the front-back direction in the vicinity of the ceiling of the vehicle 100.

Figure 2:
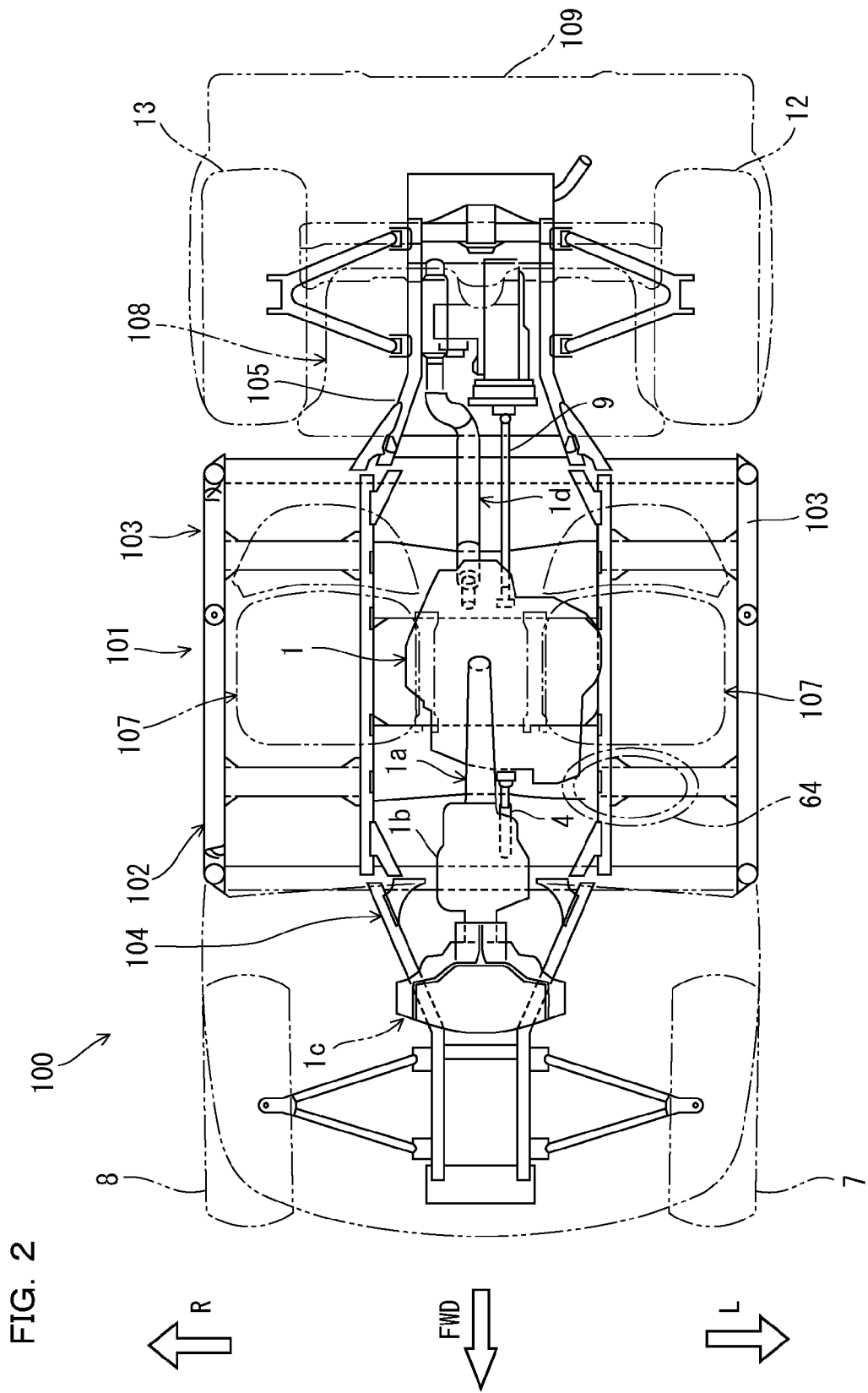
FIG. 2 is a plan view of the vehicle.

FIG. 2 is a plan view of the vehicle 100. In FIG. 2, the arrow L indicates the left of the vehicle and the arrow R indicates the right of the vehicle. As shown in FIG. 2, the under frame 102 preferably is a rectangular or substantially rectangular frame when viewed in a plan view. The front portion of the front frame 102 is connected with a front frame 104. The rear portion of the under frame 102 is connected with a rear frame 105. Left and right front wheels 7 and 8 are supported on left and right sides of the front frame 104. Left and right rear wheels 12 and 13 are supported on left and right sides of the rear frame 105. The under frame 102, the roof frames 103, the front frame 104, and the rear frame 105 constitute a vehicle body frame 101.

As shown in FIG. 1, a steering wheel 64 is provided in a front portion of the vehicle 100. A front seat 107 is provided behind the steering wheel 64. A rear seat 108 is provided behind the front seat 107. A storage box 109 is provided behind the rear seat 108.

Figure 3:
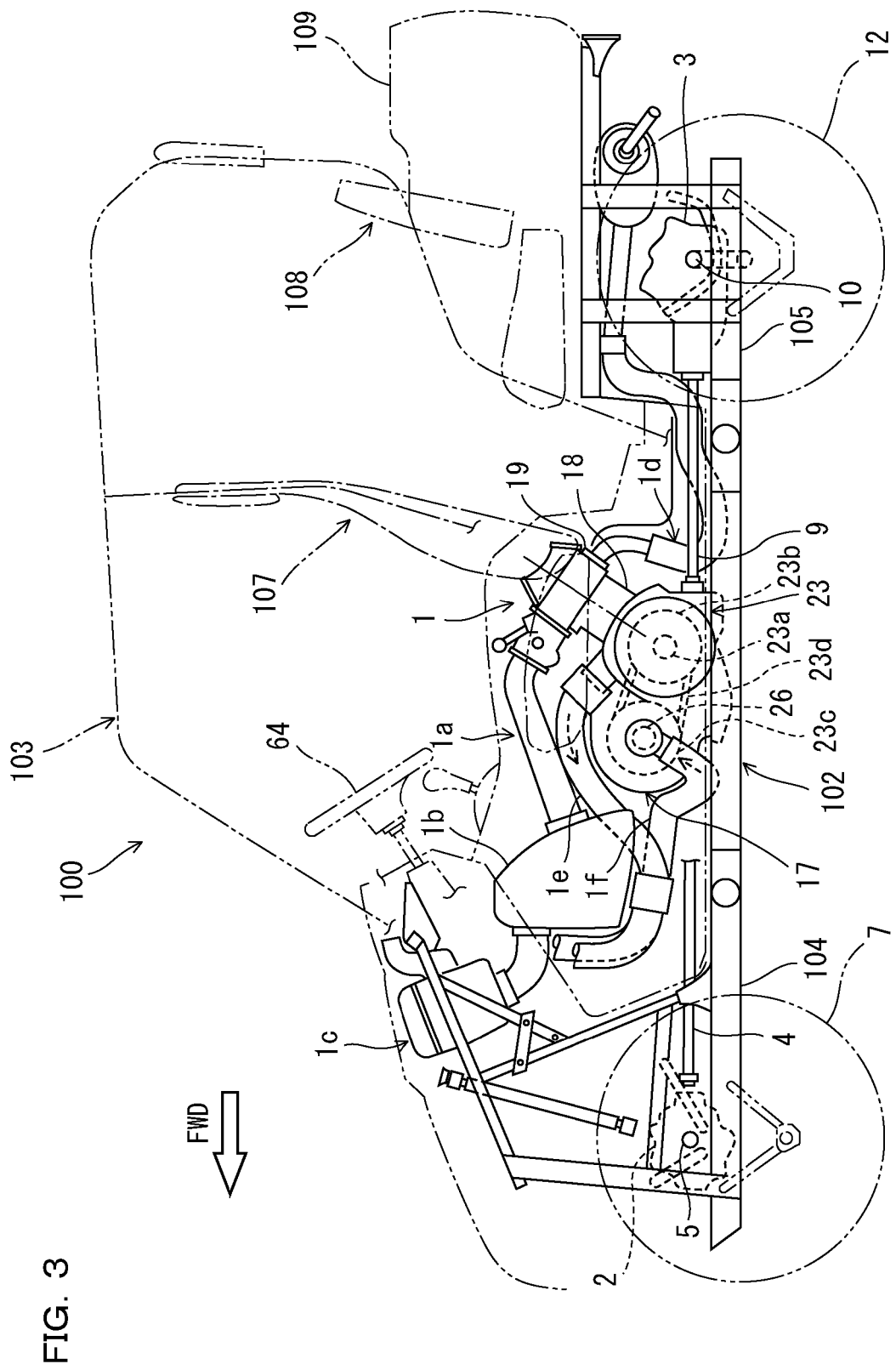
FIG. 3 is a left side view of an internal structure of the vehicle.

FIG. 3 is a left side view of an internal structure of the vehicle 100. As shown in FIG. 3, an engine 1 is provided above the under frame 102. The engine 1 is provided under the front seat 107.

Figure 4:
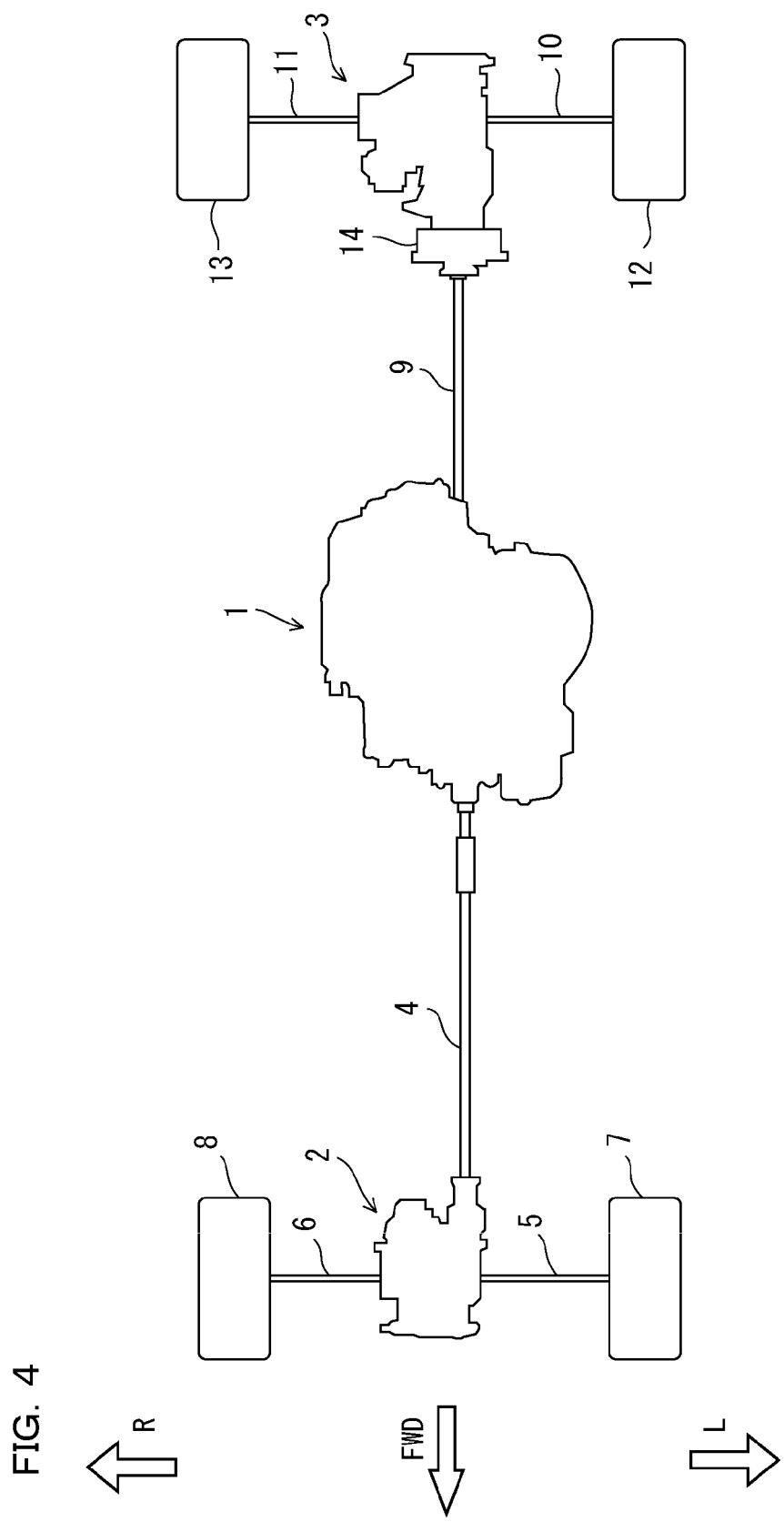
FIG. 4 is a plan view of a coupling structure of an engine and front wheels and rear wheels.

FIG. 4 is a plan view of a coupling structure between the engine 1 and the front wheels 7 and 8 and the rear wheels 12 and 13. As shown in FIG. 4, a front differential 2 is provided between the left and right front wheels 7 and 8. A rear differential 3 is provided between the left and right rear wheels 12 and 13. The driving force of the engine 1 is transmitted to the left and right front wheels 7 and 8 through a front transmission shaft 4, the front differential 2, and left and right front drive shafts 5 and 6. The driving force of the engine 1 is transmitted to the left and right rear wheels 12 and 13 through a rear transmission shaft 9, the rear differential 3, and left and right rear drive shafts 10 and 11. The rear transmission shaft 9 is provided with a parking brake 14.

Figure 5:
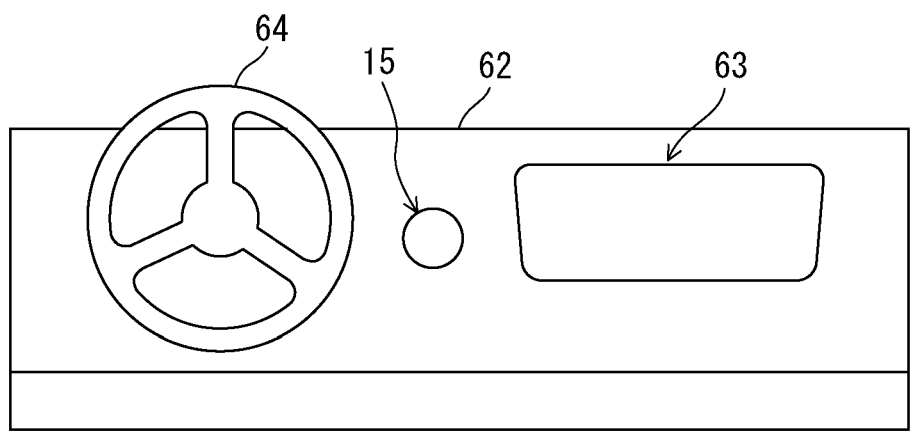
FIG. 5 is a view of an instrument panel provided in a front part of the vehicle.

FIG. 5 is a view of an instrument panel 62 provided in a front portion of the vehicle 100. The steering wheel 64 is preferably provided in a left portion of the instrument panel 62, and a meter panel 63 is provided in a right portion. A drive mode switch 15 is provided between the meter panel 63 and the steering wheel 64. The drive mode switch 15 is used to switch coupling states of the front differential 2 and the rear differential 3.

Figure 6:
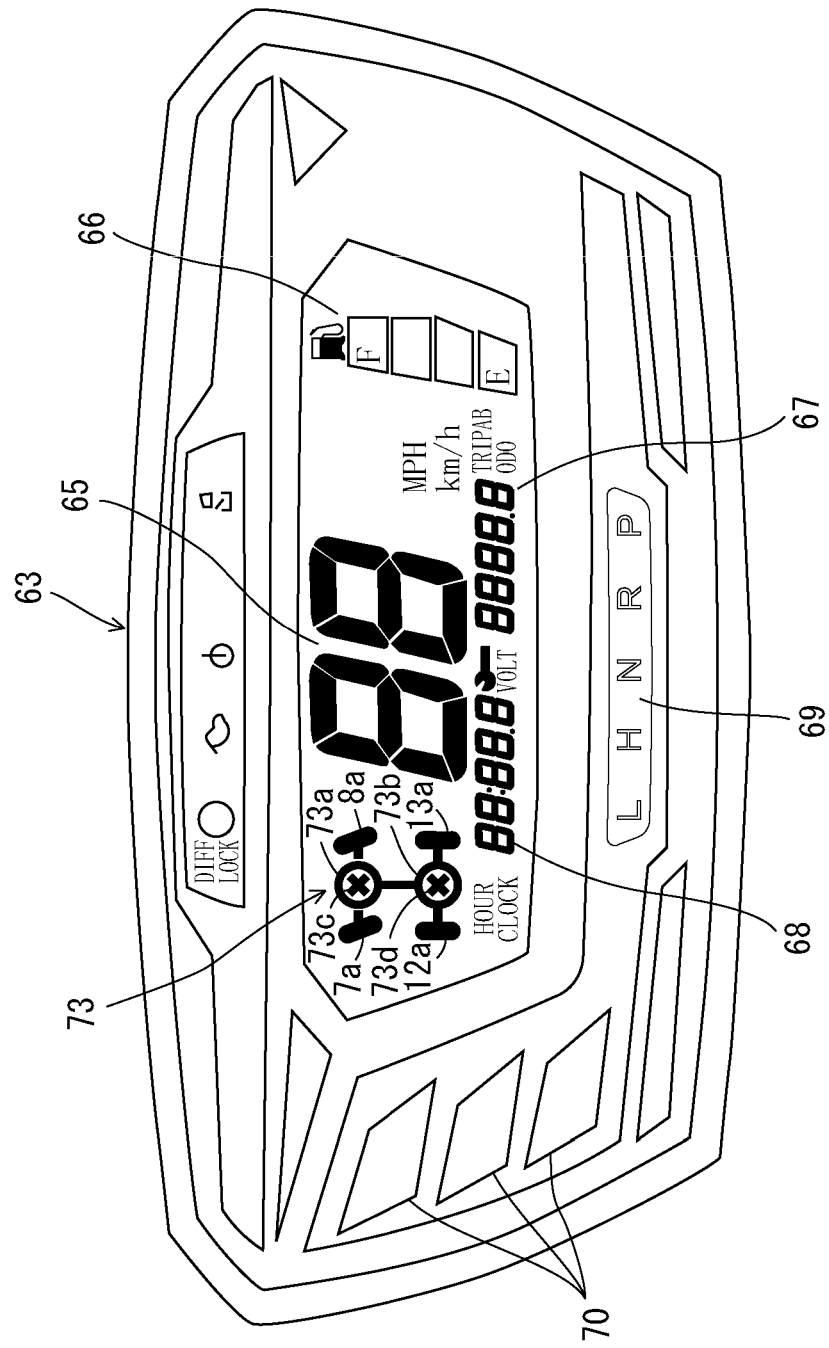
FIG. 6 is a front view of a meter panel.

FIG. 6 is a view of the meter panel 63. The meter panel 63 includes a speedometer 65, a fuel meter 66, a trip meter 67, a clock 68, a gear position indicator 69, a function switch button 70, and a drive mode indicator 73.

Figure 7:
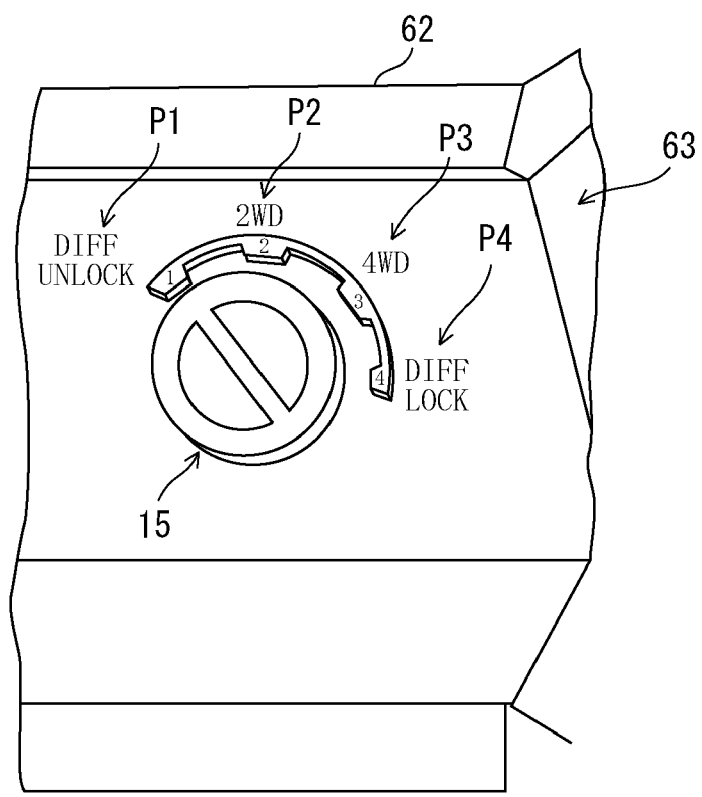
FIG. 7 is a front view of a drive mode switch.

FIG. 7 is a view of the drive mode switch 15. The drive mode switch 15 preferably is a rotary switch as shown in FIG. 7. A desired position can be selected among first to fourth positions P1 to P4, respectively, by turning the drive mode switch 15. The first to fourth positions P1 to P4 respectively correspond to first to fourth drive modes. The numbers "1," "2," "3," and "4," representing the first position P1, the second position P2, the third position P3, and the fourth position P4, respectively, and the letters "DIFF UNLOCK," "2WD," "4WD," and "DIFF LOCK" are marked in an upper portion of the drive mode switch 15. The "DIFF UNLOCK" corresponds to the first drive mode, the "2WD" to the second drive mode, the "4WD" to the third drive mode, and the "DIFF LOCK" to the fourth drive mode.

Figure 8:
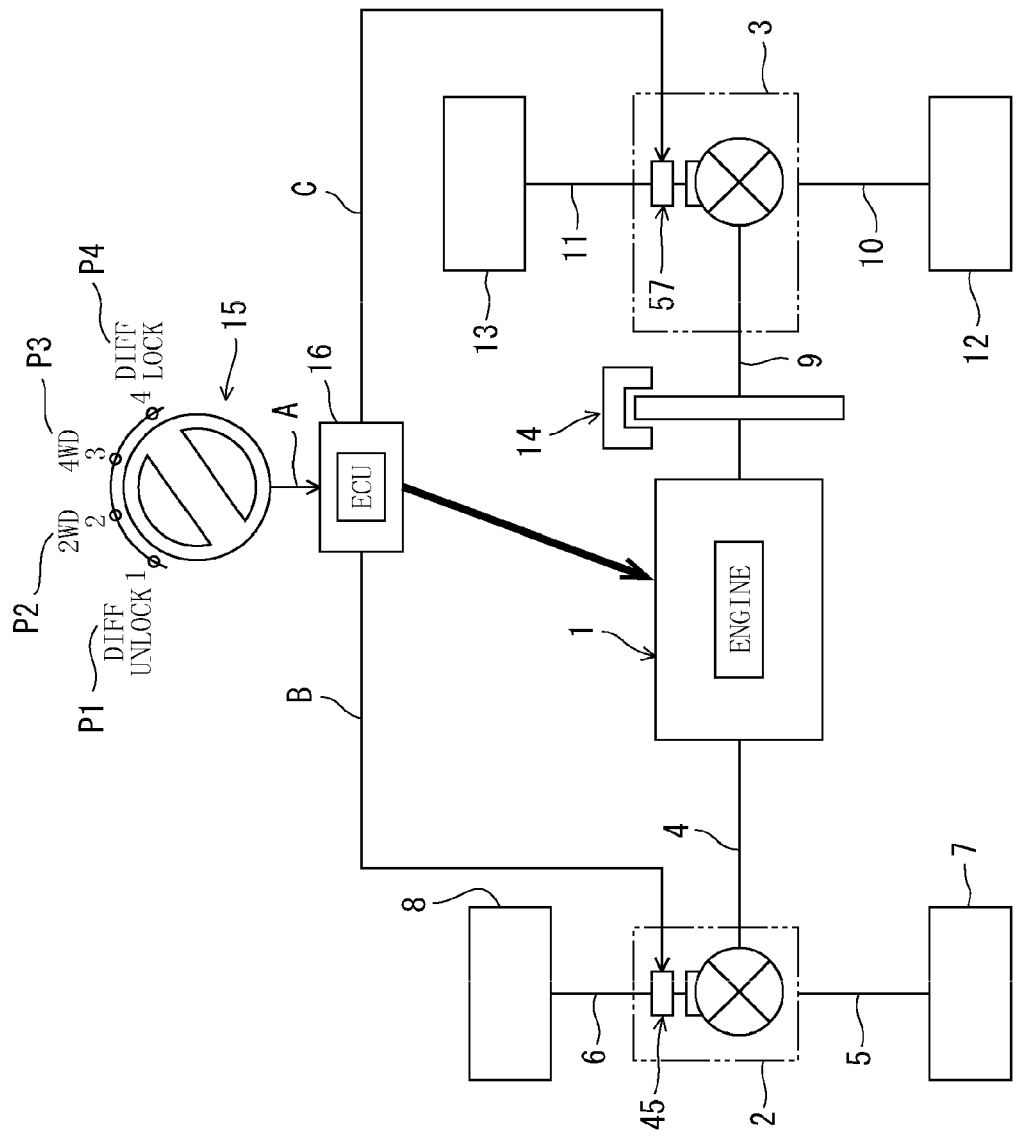
FIG. 8 is a diagram of a control system including the drive mode switch.

FIG. 8 is a diagram of a control system including the drive mode switch 15. A position signal A output from the drive mode switch 15 is input to an ECU 16. The ECU 16 outputs switch signals B and C in response to the input of the position signal A. The switch signal B output from the ECU 16 is input to the front differential 2. The switch signal C output from the ECU 16 is input to the rear differential 3. In this way, the front differential 2 and the rear differential 3 are set to coupling states determined by the drive mode switch 15. The ECU 16 serves as a drive mode controller.

The ECU 16 carries out not only the switching control of coupling states of the front differential 2 and the rear differential 3 but also control of engine operation states such as the ignition timing, the fuel injection timing, and the fuel injection amount of the engine 1.

Figure 9:
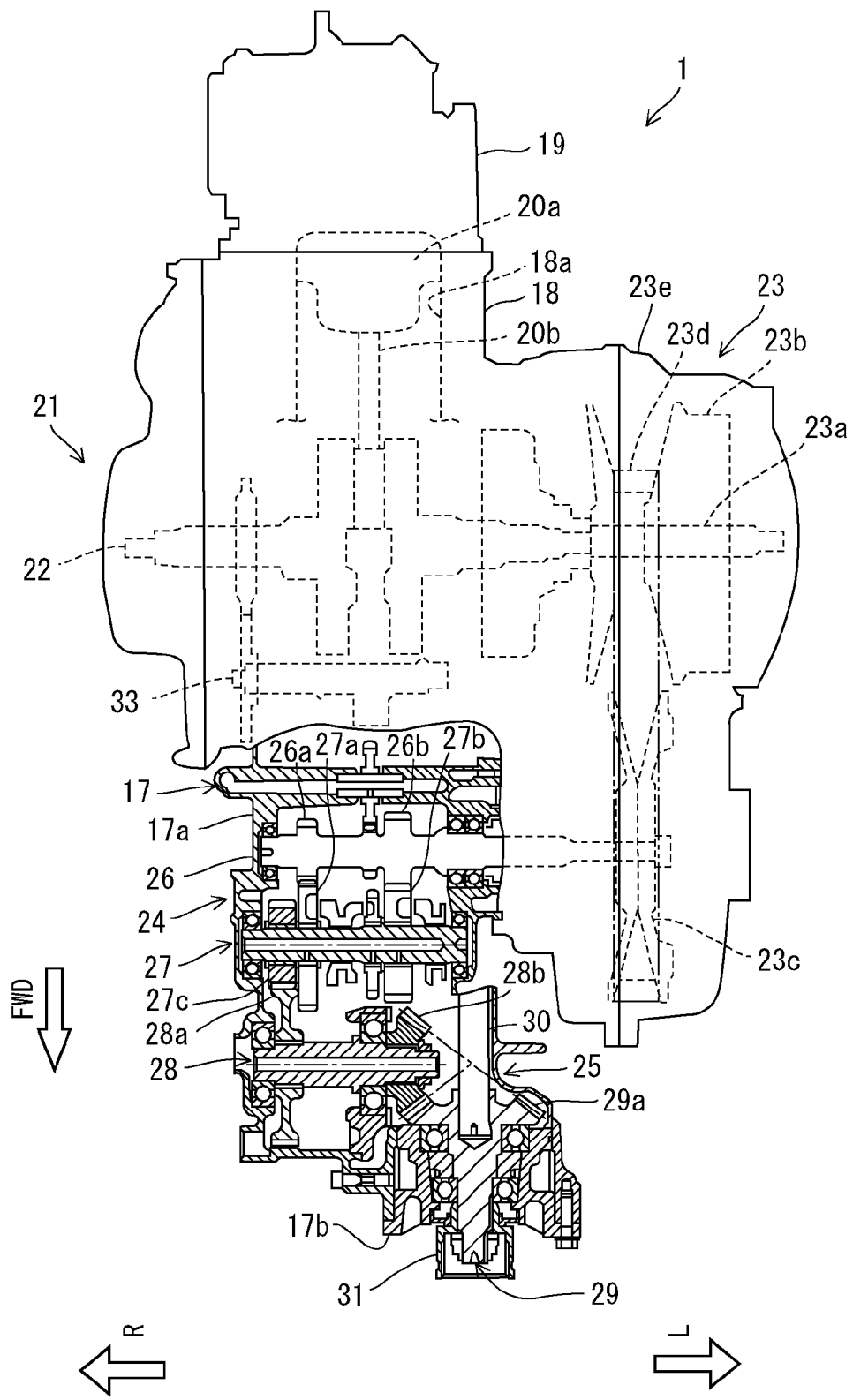
FIG. 9 is a sectional view of the engine and a transmission case.

FIG. 9 is a sectional view of the engine 1 and a transmission case 17. The engine 1 according to the present preferred embodiment preferably is a water cooled 4-cycle single cylinder engine. The engine 1 includes a crankcase 21. The crankcase 21 is coupled with a cylinder body 18 and a cylinder head 19. A piston 20a is provided in the cylinder bore 18a of the cylinder body 18 so that it can move back and forth therein. The piston 20a is coupled to a crankshaft 22 provided in the crankcase 21 by a connecting rod 20*b*. A balancer shaft 33 is provided parallel to the crankshaft 22 in the crankcase 21.

As shown in FIG. 3, an intake duct 1*a* is connected to a front portion of the engine 1. A front portion of the intake duct 1*a* is connected to a surge tank 1*b*. An air cleaner 1*c* is connected to a front of the surge tank 1*b* through a duct. An exhaust duct 1*d* is connected to a rear portion of the engine 1.

Referring back to FIG. 9, a continuously variable transmission 23 is provided at the left side of the crankcase 21. The continuously variable transmission 23 is a V-belt type continuously variable transmission. The continuously variable transmission 23 is stored in a belt case 23*e*. The transmission case 17 is provided in front of the crankcase 21. The continuously variable transmission 23 transmits the driving force of the crankshaft 22 to a power transmission mechanism in the transmission case 17.

The transmission case 17 includes a speed change gear case 17*a* and an output gear case 17*b*. A first shaft 26, a second shaft 27, and a third shaft 28 are provided in the speed change gear case 17*a*. The first shaft 26, the second shaft 27, and the third shaft 28 are provided parallel to the crankshaft 22. A transmission 24 is provided between the first shaft 26 and the second shaft 27. The left end of the first shaft 26 extends into the belt case 23*e*. An output gear mechanism 25 is provided in the output gear case 17*b*. The output gear mechanism 25 includes an output shaft 29.

The continuously variable transmission 23 includes a driving pulley 23*b* mounted to a driving shaft 23*a* and a driven pulley 23*c* mounted to the first shaft 26. A V-belt 23*d* is wound around the driving pulley 23*b* and the driven pulley 23*c*. The driving shaft 23*a* and the crankshaft 22 are connected to have a common axis.

As shown in FIG. 3, an introduction duct if arranged to introduce cooling air into the belt case 23*e* is provided. An exhaust duct 1*e* arranged to discharge cooling air in the belt case 23*e* to the outside is provided.

Referring back to FIG. 9, a gear 26*a* located on the first shaft 26 and a gear 27*a* mounted on the second shaft 27 are engaged with each other. A gear 26*b* located on the first shaft 26 and a gear 27*b* mounted on the second shaft 27 are engaged with each other. The gears 26*a* and 26*b* and the gears 27*a* and 27*b* define the transmission 24. The output gear mechanism 25 has the third shaft 28 and the output shaft 29 orthogonal to the third shaft 28. The output shaft 29 is arranged to extend along the front-back direction of the vehicle. The second shaft 27 further has a gear 27*c*. The third shaft 28 has a gear 28*a*. The rotation of the second shaft 27 is transmitted to the third shaft 28 through the gears 27*c* and 28*a*. The third shaft 28 further has a gear 28*b*. The output shaft 29 has a gear 29*a*. The rotation of the third shaft 28 is transmitted to the output shaft 29 through the gears 28*b* and 29*a*.

An inner shaft 30 is connected to a rear end of the output shaft 29. The inner shaft 30 projects backward from a rear end of the engine through the crankcase 21. The rear transmission shaft 9 is connected to a rear end of the inner shaft 30 through a joint (not shown). The front transmission shaft 4 is connected to a front end of the output shaft 29 through a joint 31.

Figure 10:
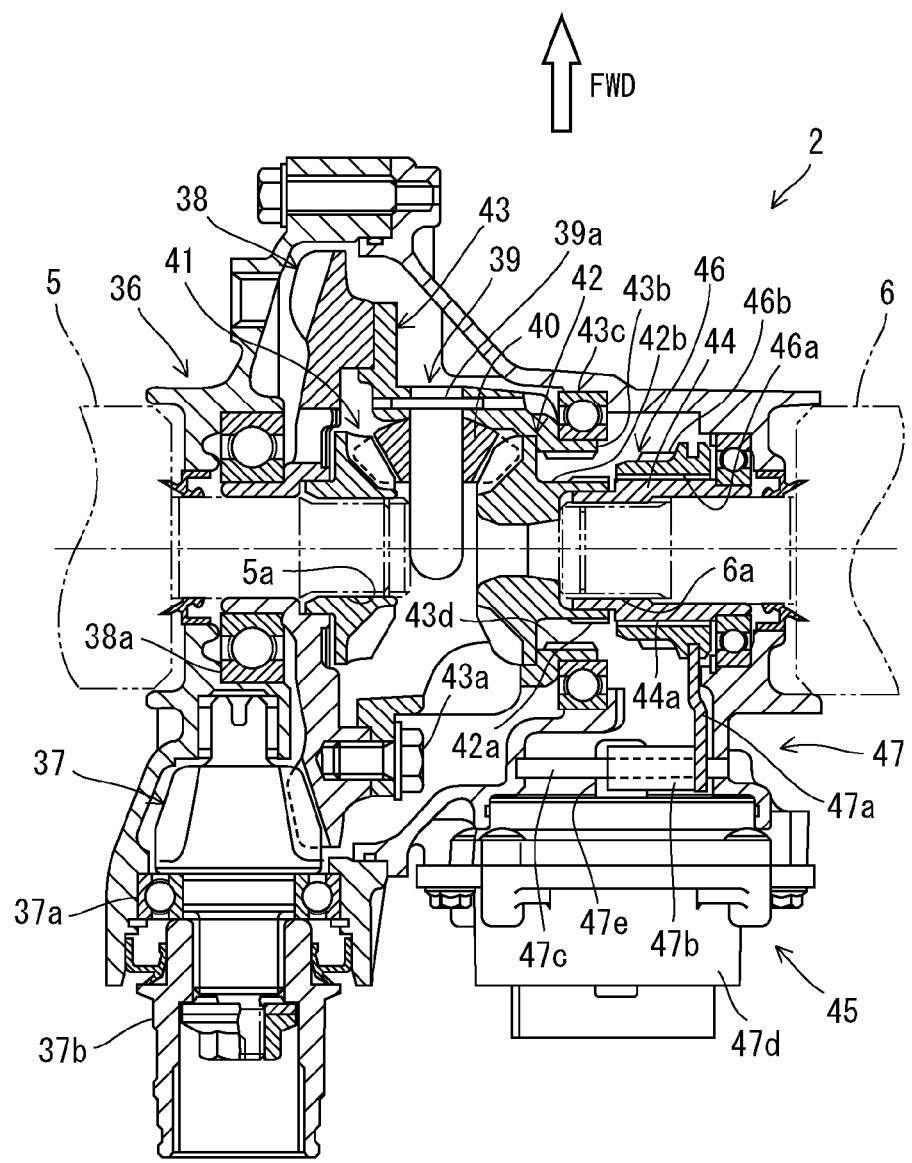
FIG. 10 is a sectional view of a front differential.

FIG. 10 is a sectional view of the front differential 2. The front differential 2 is stored in a differential case 36 attached to the front frame 104. A front input gear 37, a front ring gear 38, a front pinion shaft 39, a front pinion gear 40, and left and right front side gears 41 and 42 are provided in the differential case 36.

The front input gear 37 is supported at the differential case 36 through a bearing 37*a*. The front input gear 37 is coupled to the front transmission shaft 4 through a joint 37*b*. The front input gear 37 transmits the driving force of the engine 1 to the front differential 2.

The axial lines of the left and right front drive shafts 5 and 6 are orthogonal to the axial line of the front input gear 37. The right end 5*a* of the left front drive shaft 5 and the left end 6*a* of the right front drive shaft 6 are opposed to each other in the differential case 36.

The front ring gear 38 is supported at the differential case 36 through a bearing 38*a*. The front ring gear 38 is provided coaxially with the left front drive shaft 5. The front ring gear 38 is provided orthogonal to the front input gear 37, so that the front ring gear 38 and the front input gear 37 are engaged with each other.

A front gear case 43 is fixed to the front ring gear 38 by a bolt 43*a*. The front pinion shaft 39 is inserted into the front gear case 43 and fixed by a pin 39*a*. The front pinion shaft 39 is orthogonal to the front drive shafts 5 and 6. The front pinion gear 40 is supported rotatably at the pinion shaft 39. The front pinion gear 40 can revolve around the axis of the front ring gear 38 and rotate around the axis of the front pinion shaft 39.

The left front side gear 41 is spline-coupled to the right end 5*a* of the left front drive shaft 5 and can transmit the driving force to the left front drive shaft 5. The right front side gear 42 is supported rotatably around an outer shaft 44. The outer shaft 44 is spline-coupled to the outer circumference of the left end 6*a* of the right front drive shaft 6. The left and right front side gears 41 and 42 are engaged with the front pinion gear 40.

The differential case 36 is provided with a front switch 45 that switches the coupling state of the front differential 2. The front switch 45 has the following structure.

The right front side gear 42 and the right front drive shaft 6 are separated from each other so that the coupling state of the front differential 2 can be switched to a non-driven state. In the non-driven state, the driving force of the engine 1 is not transmitted to the left and right front wheels 7 and 8.

The right front side gear 42 and the right front drive shaft 6 are coupled and thus the coupling state of the front differential 2 can be switched to a differential state. In the differential state, the driving force of the engine is transmitted to the left and right front wheels 7 and 8 while the rotation speed difference between the left and right front wheels 7 and 8 is eliminated through adjustment.

The right front side gear 42, the right front drive shaft 6, and the front gear case 43 are coupled, in other words, the right front side gear 42, the right front drive shaft 6, and the front ring gear 38 are coupled, so that the coupling state of the front differential 2 can be switched to a differential locked state. In the differential locked state, the driving force of the engine is transmitted to the left and right front wheels 7 and 8, so that the left and right front wheels 7 and 8 rotate approximately at the same rotation speed.

The front switch 45 has a front sleeve 46 provided movably in the axial direction of the right front drive shaft 6. The front switch 45 has a front actuator 47 that moves the front sleeve 46 in the axial direction of the front drive shaft 6.

The boss portion 42*b* of the right front side gear 42 has a spline 42*a*. Another spline 44*a* is provided at the outer circumferential surface of the outer shaft 44. The size and pitch of the spline 42*a* are the same as those of the spline 44*a*. The front sleeve 46 is provided at the outer circumference of the outer shaft 44. A spline 46*a* capable of being engaged with both the splines 42*a* and 44*a* is provided at the inner circumferential surface of the front sleeve 46.

The front gear case 43 has a projection 43*b*. The projection 43*b* preferably has a tubular shape and is positioned at the outer circumference of the boss portion 42b of the right front side gear 42. The projection 43b is supported at the differential case 36 through a bearing 43c. A spline 43d is provided at the inner circumferential surface of the projection 43b. A spline 46b that is engaged with the spline 43d of the projection 43b is provided at the outer circumferential surface of the front sleeve 46.

The front actuator 47 has the following structure. A driving lever 47a is attached to the front sleeve 46. A worm gear 47b is fixed to the driving lever 47a. The worm gear 47b is supported slidably in the axial direction of the front drive shaft 6 by a guide pin 47c. A gear 47e provided at the output shaft of a motor 47d is engaged with the worm gear 47b. As the motor 47d rotates, the worm gear 47b slides in the axial direction of the right front drive shaft 6. The sliding of the worm gear 47b causes the front sleeve 46 to slide in the axial direction of the right front drive shaft 6.

Figure 11:
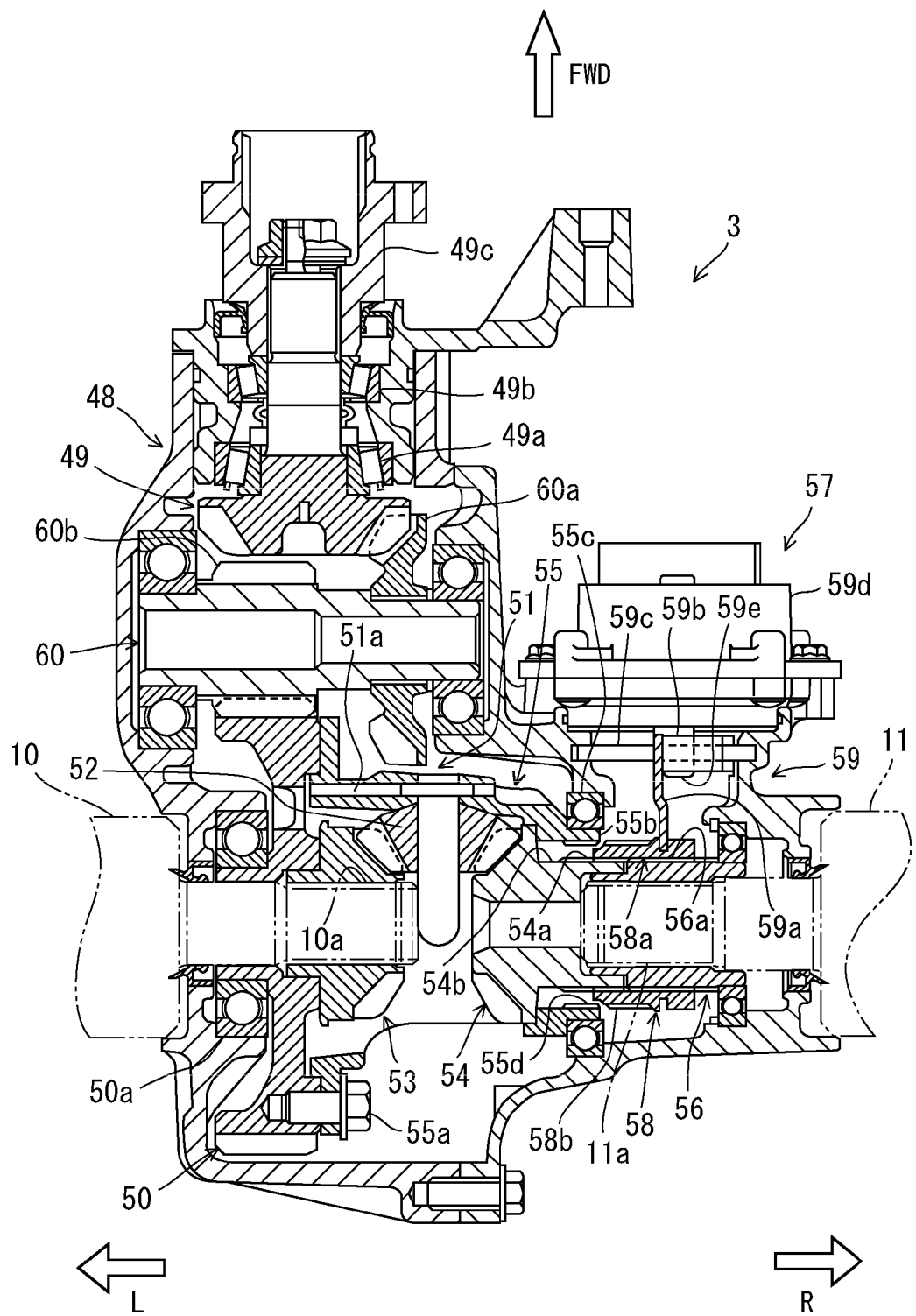
FIG. 11 is a sectional view of a rear differential.

FIG. 11 is a sectional view of the rear differential 3. The rear differential 3 is stored in a differential case 48 attached to the rear frame 105. A rear input gear 49, an intermediate shaft 60, a rear ring gear 50, a rear pinion shaft 51, a rear pinion gear 52, and left and right rear side gears 53 and 54 are stored in the differential case 48.

The rear input gear 49 is supported at the differential case 48 through bearings 49a and 49b. The rear input gear 49 is coupled to the rear transmission shaft 9 through a joint 49c. The driving force of the engine 1 is transmitted to the rear differential 3 through the rear transmission shaft 9, the joint 49c, and the rear input gear 49.

The intermediate shaft 60 is provided orthogonally to the rear input gear 49. A gear 60a provided at the intermediate shaft 60 is engaged with the rear input gear 49. A gear 60b provided in the intermediate shaft 60 is engaged with the rear ring gear 50.

The axial lines of the left and right rear drive shafts 10 and 11 are orthogonal to the axial line of the rear input gear 49. The right end 10a of the left rear drive shaft 10 and the left end 11a of the right rear drive shaft 11 are opposed to each other in the differential case 48.

The rear ring gear 50 is supported at the differential case 48 through a bearing 50a. The rear ring gear 50 is provided coaxially with the left rear drive shaft 10. The rear ring gear 50 is provided orthogonally to the rear input gear 49.

A rear gear case 55 is fixed to the rear ring gear 50 by a bolt 55a. The rear pinion shaft 51 is inserted in the rear gear case 55 and fixed by a pin 51a. The rear pinion shaft 51 is orthogonal to the rear drive shafts 10 and 11. The rear pinion gear 52 is supported rotatably by the rear pinion shaft 51. The rear pinion gear 52 can revolve around the axis of the rear ring gear 50 and can rotate around the axis of the rear pinion shaft 51.

The left rear side gear 53 is spline-coupled to the right end 10a of the left rear drive shaft 10. The driving force of the engine is transmitted to the left rear drive shaft 10 through the left rear side gear 53. The right rear side gear 54 is supported rotatably by an outer shaft 56. The outer shaft 56 is spline-coupled to the outer circumference of the left end 11a of the right rear drive shaft 11. The left and right rear side gears 53 and 54 are engaged with the rear pinion gear 52.

The differential case 48 is provided with a rear switch 57 that switches the coupling state of the rear differential 3. The rear switch 57 has the following structure.

The right rear side gear 54 and the right rear drive shaft 11 are coupled, so that the coupling state of the rear differential 3 is set to a differential state. In the differential state, the driving force of the engine 1 is transmitted to the left and right rear wheels 12 and 13 as the rotation speed difference between the left and right rear wheels 12 and 13 is eliminated through adjustment.

The right rear side gear 54 and the rear gear case 55 are coupled, in other words, the right rear side gear 54 and the rear ring gear 50 are coupled, so that the coupling state of the rear differential 3 is set to a differential locked state. In the differential locked state, the driving force of the engine 1 is transmitted to the left and right rear wheels 12 and 13 so that the left and right rear wheels 12 and 13 rotate approximately at the same rotation speed.

The rear switch 57 has a rear sleeve 58 provided slidably in the axial direction of the right rear drive shaft 11. The rear switch 57 has a rear actuator 59 that causes the rear sleeve 58 to slide.

The boss portion 54b of the right rear side gear 54 has a spline 54a. A spline 56a is provided at the outer circumferential surface of the outer shaft 56. The size and pitch of the spline 54a are the same as those of the spline 56a. A spline 58a that can be engaged with both splines 54a and 56a is provided at the inner circumferential surface of the rear sleeve 58.

The rear gear case 55 has a projection 55b. The projection 55b is positioned at the outer circumference of the boss portion 54b of the right front side gear 54. The projection 55b is supported at the differential case 48 through a bearing 55c. A spline 55d is provided at the inner circumferential surface of the projection 55b. A spline 58b that is engaged with the spline 55d of the projection 55b is provided at the outer circumferential surface of the rear sleeve 58.

The front actuator 59 has the following structure. A driving lever 59a is attached to the rear sleeve 58. A worm gear 59b is fixed to the driving lever 59a. The worm gear 59b is supported slidably in the axial direction of the rear drive shaft 11 by a guide pin 59c. A driving gear 59e is provided at the output shaft of a motor 59d. The worm gear 59b and the driving gear 59e are engaged with each other. As the motor 59d rotates, the worm gear 59b slides in the axial direction of the rear drive shaft 11. The sliding of the worm gear 59b causes the rear sleeve 58 to slide in the axial direction of the rear drive shaft 11.

Referring back to FIG. 7, the drive mode switch 15 is allowed to turn only to the second position P2 from the first position P1. The drive mode switch 15 is allowed to turn only to the first position P1 or the third position P3 from the second position P2. The drive mode switch 15 is allowed to turn only to the second position P2 or the fourth position P4 from the third position P3. The drive mode switch 15 is allowed to turn only to the third position P3 from the fourth position P4.

The driver can continuously operate the drive mode switch 15 to change the position, for example, from the first position P1 to the third position P3. Even in this case, the control of the differential is carried out by way of the second drive mode. The ECU 16 detects the change in the position of the drive mode switch 15 from the first position P1 to the third position. In this case, the ECU 16 controls the change from the first drive mode to the second drive mode and the change from the second drive mode to the third drive mode successively.

As described by referring to FIG. 6, the meter panel 63 is provided with a drive mode indicator 73 that indicates the coupling states of the front differential 2 and the rear differential 3. The drive mode indicator 73 indicates which coupling states among the first to fourth drive modes that the front differential 2 and the rear differential 3 are in.

FIGS. 12A to 12D are views showing displays indicated at the drive mode indicator 73. The drive indicator 73 has left and right front wheel marks 7a and 8a indicating the pair of left and right front wheels 7 and 8 and left and right rear wheel marks 12*a* and 13*a* indicating the pair of left and right rear wheels 12 and 13.

The drive mode indicator 73 indicates a circle 73*a* between the left and right front wheel marks 7*a* and 8*a* to show that the front differential 2 is in a differential state.

The drive mode indicator 73 indicates a circle 73*b* between the left and right rear wheel marks 12*a* and 13*a* to show that the differential 3 is in a differential state.

The drive mode indicator 73 indicates a circle 73*a* between the left and right front wheel marks 7*a* and 8*a* and a cross 73*c* in the circle 73*a* to show that the front differential 2 is in a differential locked state.

The drive mode indicator 73 indicates a circle 73*b* between the left and right rear wheel mark 12*a* and 13*a* and a cross 73*d* in the circle 73*b* to show that the differential 3 is in a differential locked state.

The drive mode indicator 73 indicates none of the circle 73*a* and the cross 73*c* between the left and right front wheel marks 7*a* and 8*a* to show that the front differential 2 is in a non-driven state.

When the driver turns the drive mode switch 15 to an intended position, a position signal A is output to the ECU 16 as shown in FIG. 8. The ECU 16 outputs control signals B and C to the front actuator 47 and the rear actuator 59 so that the front differential 2 and the rear differential 3 are set to coupling states in response to the position signal A.

When the driver sets the drive mode switch 15 to the first position P1, the drive mode is switched to the first drive mode. In the first drive mode, the front switch 45 switches the front differential 2 to a non-driven state and the rear switch 57 switches the rear differential 3 to a differential state.

Figure 13A:
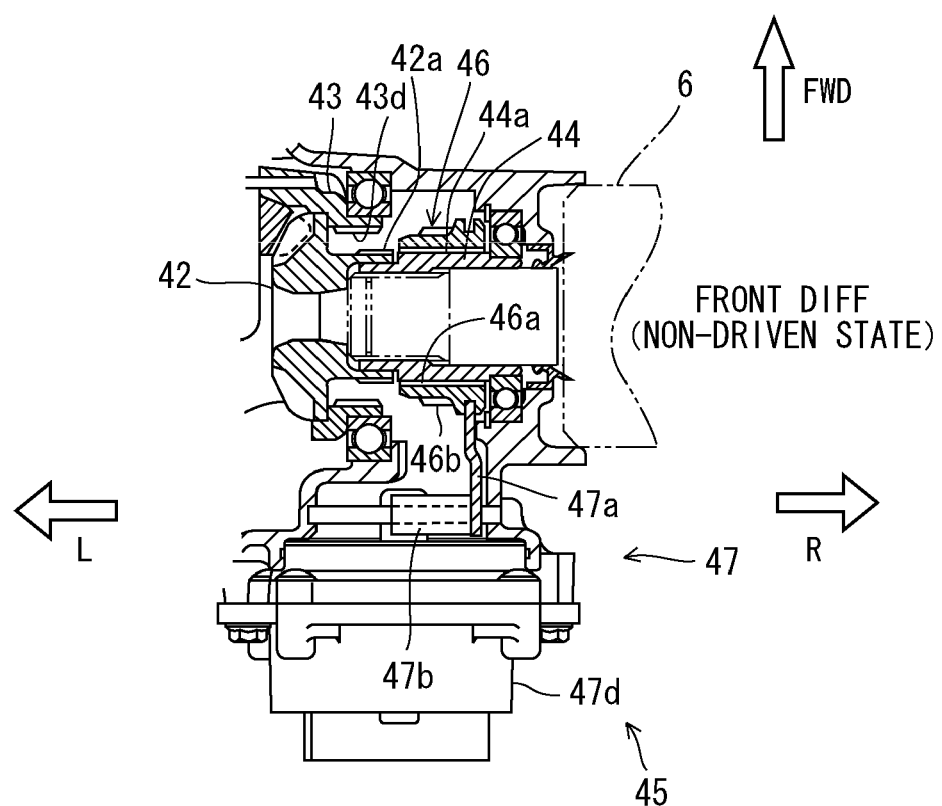
FIG. 13A is a view of a coupling state of the front differential in a first drive mode.
Figure 13B:
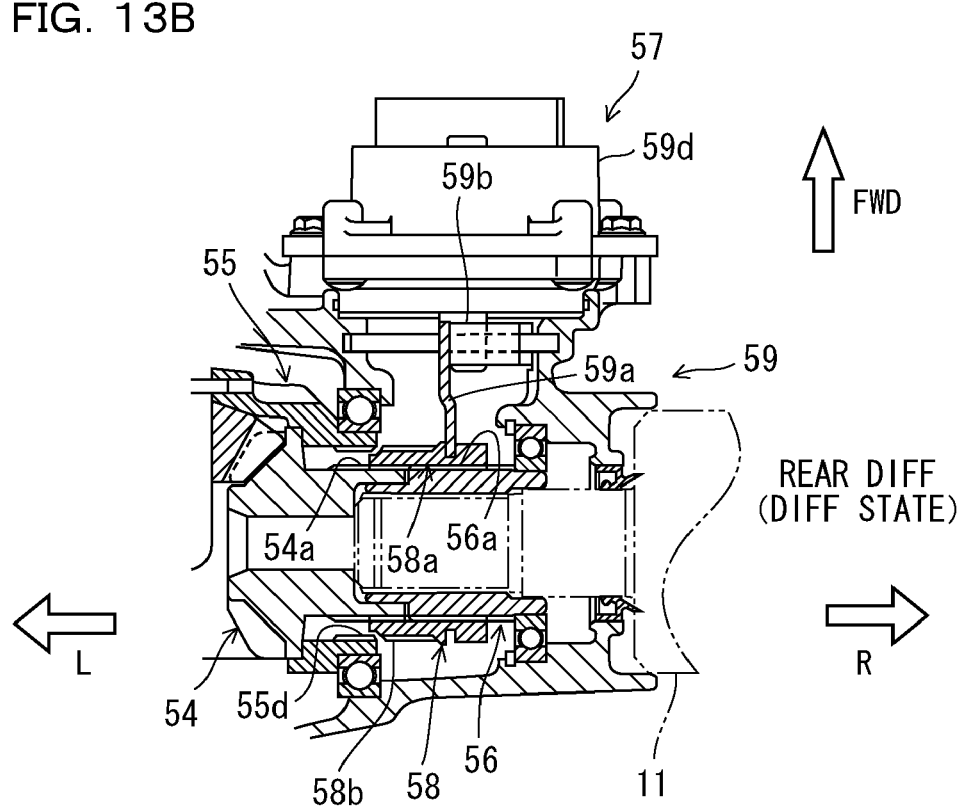
FIG. 13B is a view of a coupling state of the rear differential in the first drive mode.

FIG. 13A is a view of the state of the front differential 2 in the first drive mode. FIG. 13B is a view of the state of the rear differential 3 in the first drive mode.

As shown in FIG. 13A, in the first drive mode, the rotation of the motor 47*d* at the front switch 45 moves the front sleeve 46 to the right (in the direction of the arrow R). The rightward movement of the front sleeve 46 causes the right front drive shaft 6 and the right front side gear 42 to be separated from each other, so that the driving force of the engine is not transmitted to the left and right front drive shafts 5 and 6.

As shown in FIG. 13B, in the first drive mode, the rotation of the motor 59*d* at the rear switch 57 moves the rear sleeve 58 to the left (in the direction of the arrow L). The leftward movement of the rear sleeve 58 causes the spline 58*a* provided at the inner circumferential surface of the rear sleeve 58 to be engaged with both the right rear side gear 54 and the outer shaft 56, so that the driving force of the engine is transmitted to the rear drive shafts 10 and 11. The rotation speed difference between the left and right rear wheels 12 and 13 is eliminated through adjustment. For example, during counter-clockwise turning, the resistance of the left rear wheel 12 increases, and therefore the rear pinion gear 52 revolves to rotate the right rear side gear 54 by an extra amount. The rotation speed of the right rear wheel 13 increases and this allows the counter-clockwise turning to be more smoothly performed.

Figure 12A:
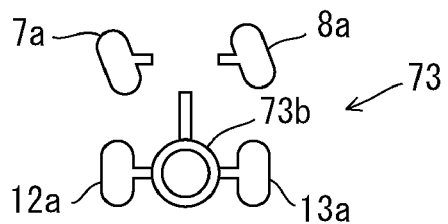
FIGS. 12A to 12D are views of displays indicated by a drive mode indicator.

In the first drive mode, the drive mode indicator 73 indicates nothing between the left and right front wheel marks 7*a* and 8*a* and a circle 73*b* between the left and right rear wheel marks 12*a* and 13*a* as shown in FIG. 12A.

When the driver sets the drive mode switch 15 to the second position P2, the drive mode is switched to the second drive mode. In the second drive mode, the front switch 45 sets the front differential 2 to a non-driven state, and the rear switch 57 sets the rear differential 3 to a differential locked state.

Figure 14A:
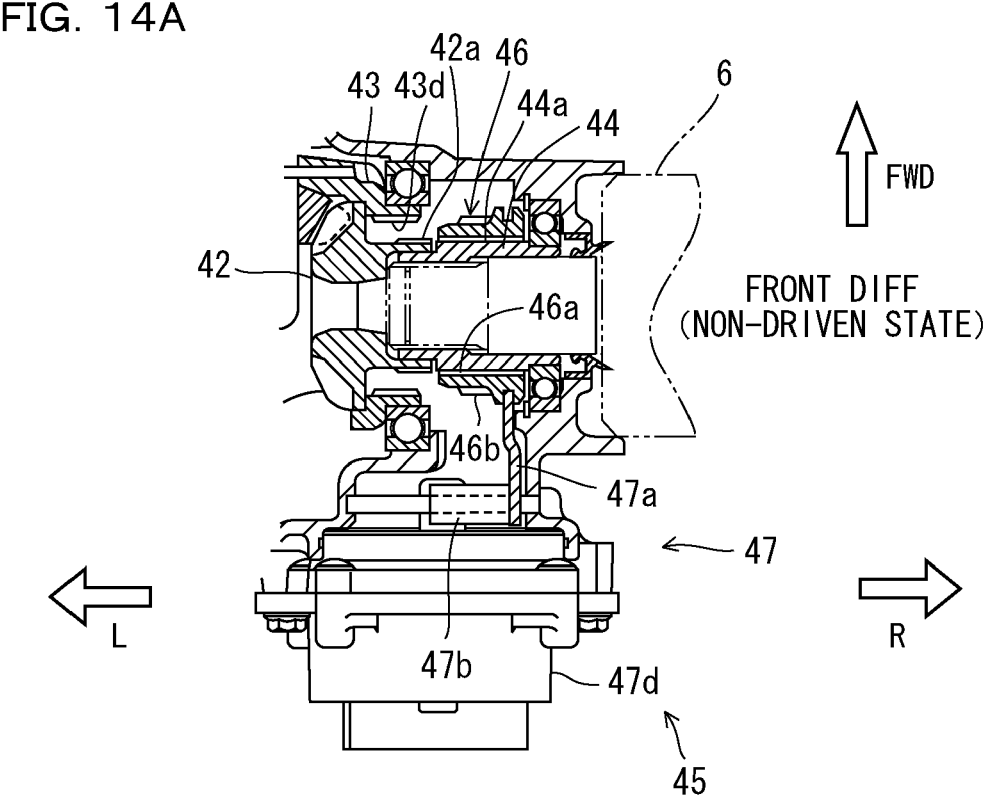
FIG. 14A is a view of a coupling state of the front differential in a second drive mode.

FIG. 14A is a view of the state of the front differential 2 in the second drive mode. FIG. 14B is a view of the state of the rear differential 3 in the second drive mode.

As shown in FIG. 14A, in the second drive mode, the rotation of the motor 47*d* at the front switch 45 causes the front sleeve 46 to move to the right (in the direction of the arrow R). The rightward movement of the front sleeve 46 causes the right front drive shaft 6 and the right front side gear 42 to be separated, so that the driving force of the engine is not transmitted to the left and right front drive shafts 5 and 6.

As shown in FIG. 14B, in the first drive mode, the rotation of the motor 59*d* at the rear switch 57 moves the rear sleeve 58 further to the left from the state shown in FIG. 13B (in the direction of the arrow L). In this way, the spline 58*b* provided at the outer circumferential surface of the rear sleeve 58 is engaged with the spline 55*d* provided at the rear gear case 55. The spline 58*a* provided at the inner circumferential surface of the rear sleeve 58 is engaged with both the right rear side gear 54 and the outer shaft 56. In this way, the left and right rear side gears 53 and 54 are directly coupled with the rear ring gear 50, and the left and right rear drive shafts 10 and 11 rotate at the same speed as the rear ring gear 50.

Figure 12B:
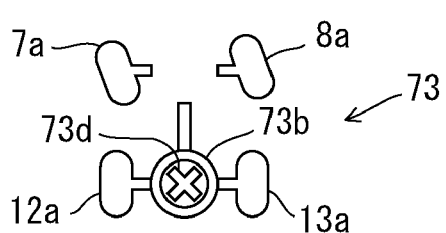

In the second drive mode, the drive mode indicator 73 indicates nothing between the left and right front wheel marks 7*a* and 8*a* and a circle 73*b* and a cross 73*d* between the left and right rear wheel marks 12*a* and 13*a* as shown in FIG. 12B.

When the driver sets the drive mode switch 15 to the third position P3, the drive mode is switched to the third drive mode. In the third drive mode, the front switch 45 sets the front differential 2 to a differential state, and the rear switch 57 sets the rear differential 3 to a differential locked state.

Figure 15A:
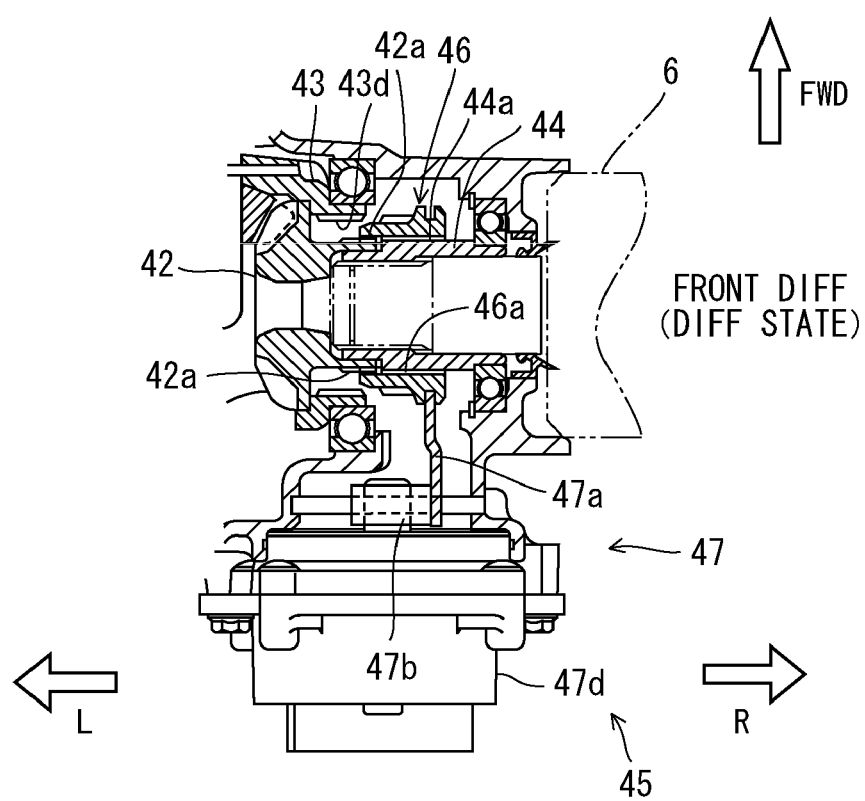
FIG. 15A is a view of a coupling state of the front differential in a third drive mode.
Figure 15B:
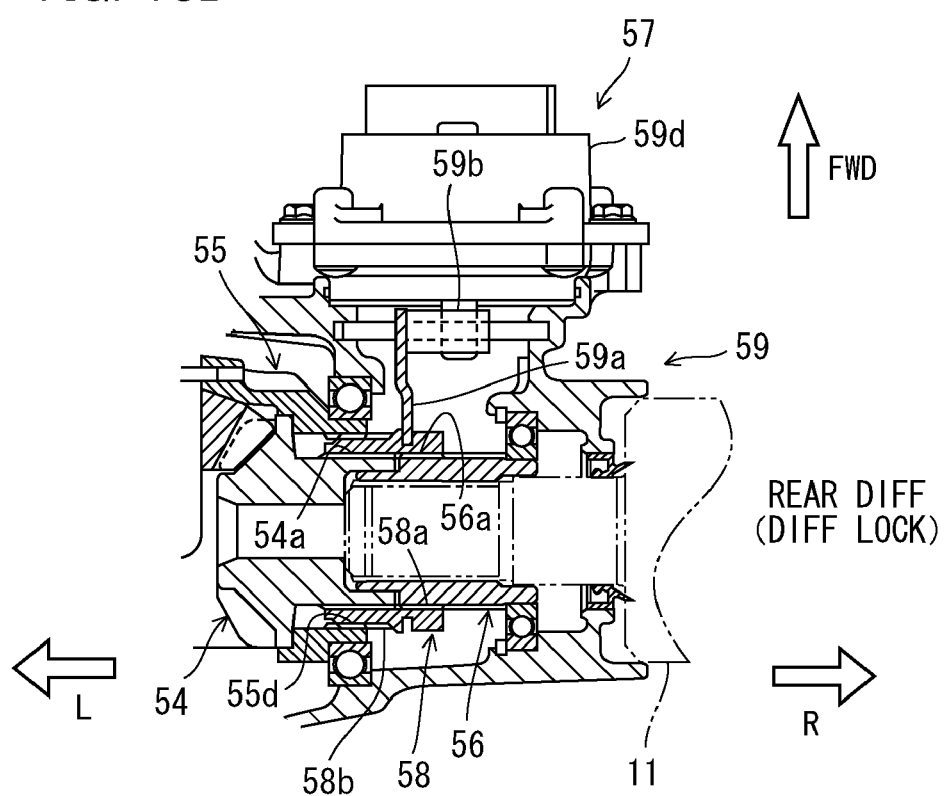
FIG. 15B is a view of a coupling state of the rear differential in the third drive mode.

FIG. 15A is a view of the state of the front differential 2 in the third drive mode. FIG. 15B is a view of the state of the rear differential 3 in the third drive mode.

As shown in FIG. 15A, in the third drive mode, the rotation of the motor 47*d* at the front switch 45 moves the front sleeve 46 to the left (in the direction of the arrow L). The leftward movement of the front sleeve 46 causes the spline 46*a* provided at the inner circumferential surface of the front sleeve 46 to be engaged with both the right front side gear 42 and the outer shaft 44, so that the driving force of the engine is transmitted to the left and right front drive shafts 5 and 6. The rotation speed difference between the left and right front wheels 7 and 8 is eliminated through adjustment. For example, during counter-clockwise turning, the resistance of the left front wheel 7 increases, and therefore the front pinion gear 40 revolves to rotate the right front side gear 42 by an extra amount. The increase of rotation speed of the right front wheel 7 allows the counter-clockwise turning to be performed more smoothly.

As shown in FIG. 15B, in the third drive mode, the rotation of the motor 59*d* at the rear switch 57 causes the rear sleeve 58 to be in the same state as the state shown in FIG. 14B. In this way, the left and right side gears 53 and 54 are directly coupled to the rear ring gear 50, so that the left and right rear drive shafts 10 and 11 rotate at the same speed as the ring gear 50.

Figure 12C:
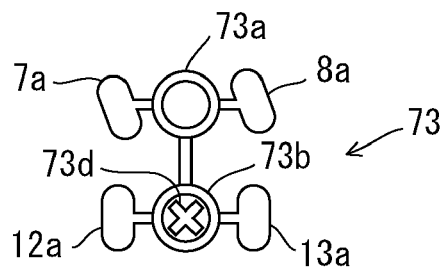

In the third drive mode, the drive mode indicator 73 indicates a circle 73*a* between the left and right front wheel marks 7*a* and 8*a* and a circle 73*b* and a cross 73*d* between the left and right rear wheel marks 12*a* and 13*a* as shown in FIG. 12C.

When the driver sets the drive mode switch 15 to the fourth position P4, the drive mode is switched to the fourth drive mode. In the fourth drive mode, the front switch 45 sets the front differential 2 to a differential locked state and the rear switch 57 sets the rear differential 3 to a differential locked state.

Figure 16A:
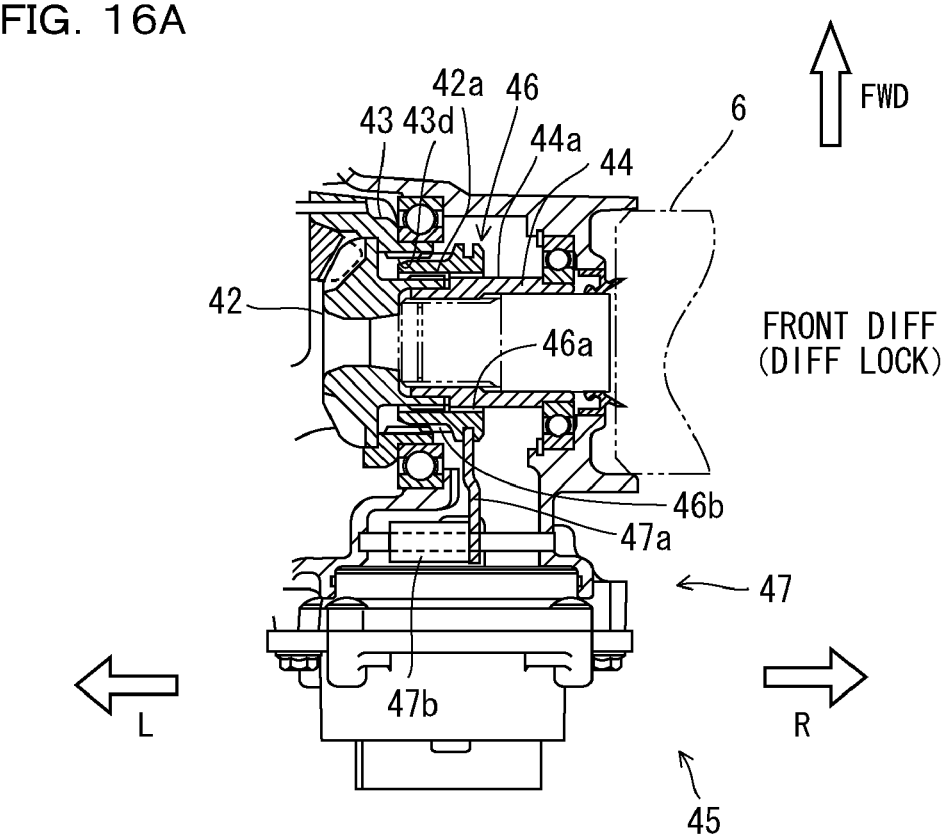
FIG. 16A is a view of a coupling state of the front differential in a fourth drive mode.

FIG. 16A is a view of the state of the front differential 2 in the fourth drive mode. FIG. 16B is a view of the state of the rear differential 3 in the fourth drive mode.

As shown in FIG. 16A, in the fourth drive mode, the rotation of the motor 47d at the front switch 45 causes the front sleeve 46 to move further to the left (in the direction of the arrow L) from the state shown in FIG. 15A. In this way, the spline 46b provided at the outer circumferential surface of the front sleeve 46 is engaged with the spline 43d provided at the front gear case 43. The spline 46a provided at the inner circumferential surface of the front sleeve 46 is engaged with both the right front side gear 42 and the outer shaft 44. This allows the left and right front side gears 41 and 42 to be directly coupled to the front ring gear 38, so that the left and right drive shafts 5 and 6 rotate at the same speed as the front ring gear 38.

As shown in FIG. 16B, in the fourth drive mode, the rotation of the motor 59d at the rear switch 57 causes the rear sleeve 58 to be in the same state as the state shown in FIG. 14B. In this way, the left and right rear side gears 53 and 54 are coupled directly to the ring rear gear 50, so that the left and right rear drive shafts 10 and 11 rotate at the same speed as the rear ring gear 50.

Figure 12D:
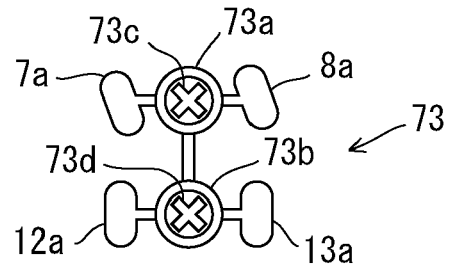

In the fourth drive mode, the drive mode indicator 73 indicates a circle 73a and a cross 73c between the left and right front wheel marks 7a and 8a and a circle 73b and a cross 73d between the left and right rear wheel marks 12a and 13a as shown in FIG. 12D.

Figure 17:
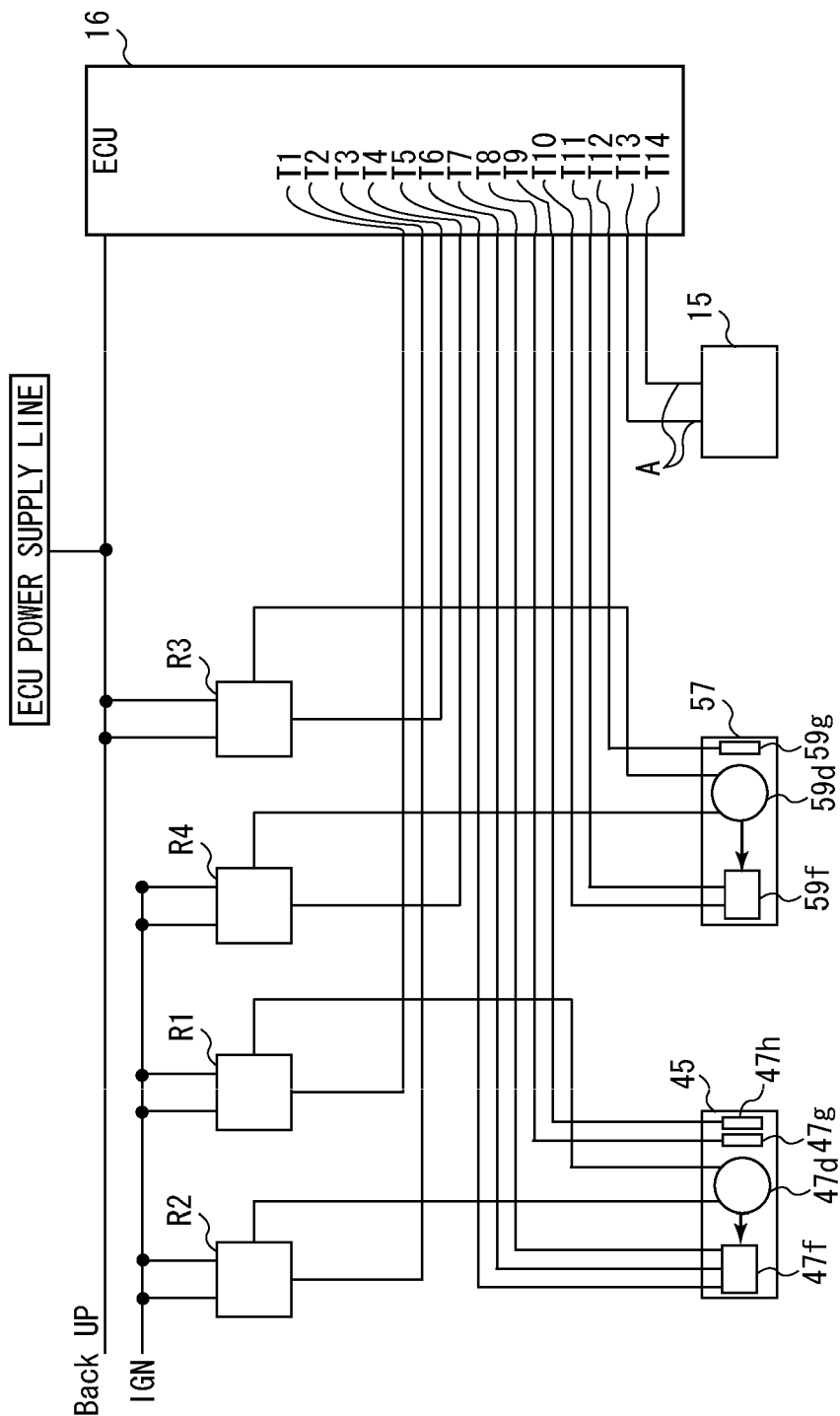
FIG. 17 is a circuit diagram of a drive mode switching device.

FIG. 17 is a circuit diagram of a drive mode switching device. The ECU 16 is connected with four relays R1 to R4, for example. The relay R1 is connected to the terminal T1 of the ECU 16, the relay R2 to the terminal T2 of the ECU 16, the relay R3 to the terminal T3 of the ECU 16, and the relay R4 to the terminal T4 of the ECU 16. The ECU 16 outputs an ON/OFF signal to the relays R1 to R4 through the terminals T1 to T4.

The ECU 16 is connected with the front switch 45 including the motor 47d. The ECU 16 is connected with the rear switch 57 including the motor 59d. As described above in conjunction with FIG. 10, the motor 47d is a motor used to control the coupling state of the front differential 2. As described above in conjunction with FIG. 11, the motor 59d is a motor used to control the coupling state of the rear differential 3. According to the present preferred embodiment, servo motors, for example, are preferably used for the motor 47d and the motor 59d.

The three terminals T5 to T7 of the ECU 16 are connected to a sensor 47f. The sensor 47f detects the rotating position of the motor 47d. The ECU 16 inputs a signal indicating the rotation position of the motor 47d from the sensor 47f. The terminal T8 of ECU 16 is connected to a control switch 47g. The terminal T9 of the ECU 16 is connected to a control switch 47h. The rotation position of the motor 47d is controlled based on the states of the control switches 47g and 47h and the states of the relays R1 and R2.

Two terminals T10 and T11 of the ECU 16 are connected to a sensor 59f. The sensor 59f detects the rotation position of the motor 59d. The ECU 16 inputs a signal indicating the rotation position of the motor 59d from the sensor 59f. The terminal T12 of the ECU 16 is connected to a control switch 59g. The rotation position of the motor 59d is controlled based on the state of the control switch 59g and the states of the relays R3 and R4.

The ECU 16 is connected with the drive mode switch 15. The terminals T13 and T14 of the ECU 16 receive an operation signal input from the drive mode switch 15.

The signals input to the terminals T13 and T14 correspond to the position signal A shown in FIG. 8. The signals output from the terminals T1, T2, T8, and T9 correspond to the switch signal B shown in FIG. 8. The signals output from the terminals T3, T4, and T12 correspond to the switch signal C shown in FIG. 8.

The relays R1 and R2 are relays used to control the motor 47d. More specifically, the relays R1 and R2 control the front differential 2. The relays R3 and R4 are relays used to control the motor 59d. More specifically, the relays R3 and R4 control the rear differential 3.

Figures 18, 19:
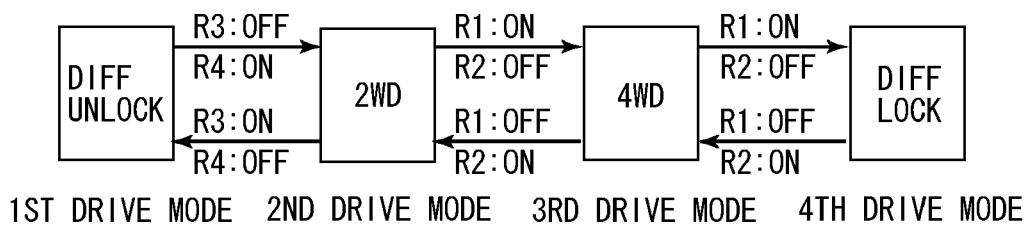
FIG. 18 is a diagram showing the relationship between the states of the relays and the drive modes.
FIG. 19 is a table showing the relationship between the states of a control switch and the drive modes.

FIG. 18 is a diagram showing the relationship between the states of the relays and the drive modes. In FIG. 18, the block labeled "DIFF UNLOCK" indicates the first drive mode. The block labeled "2WD" indicates the second drive mode. The block labeled "4WD" indicates the third drive mode. The block labeled "DIFF LOCK" indicates the fourth drive mode.

In the first drive mode, when control is carried out so that the relay R3 is turned off and the relay R4 is turned on, the vehicle 1 is switched to the second drive mode. In the second drive mode, when control is carried out so that the relay R1 is turned on and the relay R2 is turned off, the vehicle 1 is switched to the third drive mode. In the third drive mode, when control is carried out so that the relay R1 is turned on and the relay R2 is turned off, the vehicle 1 is switched to the fourth drive mode.

In the fourth drive mode, when control is carried out so that the relay R1 is turned off and the relay R2 is turned on, the vehicle 1 is switched to the third drive mode. In the third drive mode, when control is carried out so that the relay R1 is turned off and the relay R2 is turned on, the vehicle 1 is switched to the second drive mode. In the second drive mode, when control is carried out so that the relay R3 is turned on and the relay R4 is turned off, the vehicle 1 is switched to the first drive mode.

FIG. 19 is a table showing the relationship between the states of the control switch and the drive modes. The control switch 47g is turned on when the front differential 2 is set to a differential locked state. The control switch 47h is turned on when the front differential 2 is set to a non-driven state. The control switch 59g is turned on when the rear differential 3 is set to a differential state. The motors 47d and 59d have their rotation positions controlled based on the states of the relays R1 to R4 shown in FIG. 18 and the states of the control switches shown in FIG. 19.

Figure 20:
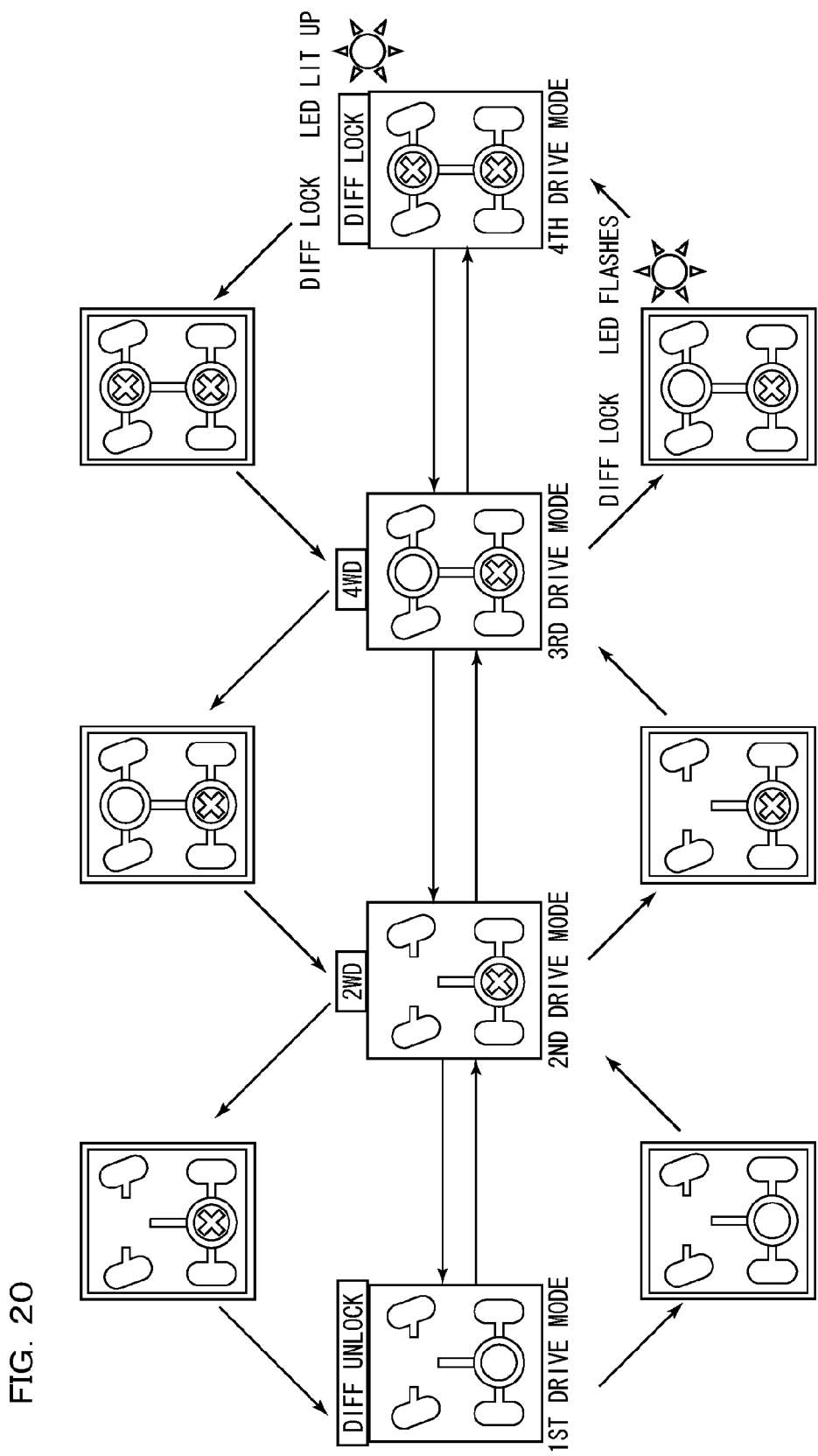
FIG. 20 is a view showing the relationship between transition of the drive mode and displays indicated by the drive mode indicator.

FIG. 20 is a view showing the relationship between the transition of the drive mode and displays indicated by the drive mode indicator 73. In FIG. 20, the frame surrounded by a double line indicates the state of flashing. During a time when the drive mode is changed from one drive mode to an adjacent drive mode, the displays indicated by the drive mode indicator flashes. When changing of the coupling state of the front differential 2 or the rear differential 3 is complete, the flashing ends and a new drive mode is indicated. The driver can visually check the completion of the switching operation of the differential. In the fourth drive mode, an LED that indicates that the front differential 2 is in a differential locked state lights up. During transition from the third drive mode to the fourth drive mode, the LED flashes. The driver can be surely aware of the transition of the front and rear wheels to a differential locked state.

Figure 21:
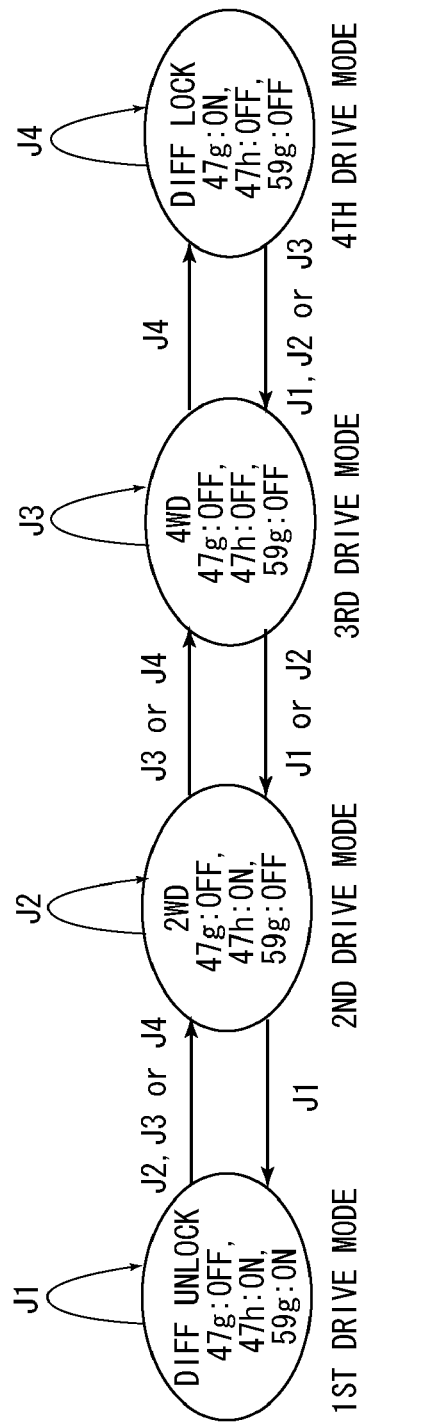
FIG. 21 is a state transition diagram of the drive mode.

FIG. 21 is a state transition diagram for the drive mode. In FIG. 21, J1 represents a transition request to the first drive mode, and J2 to J4 represent transition requests to the second to fourth drive modes. The occurrence of J2, J3, or J4 in the first drive mode indicates the transition of the drive mode to the second drive mode. The occurrence of J3 or J4 in the second drive mode indicates that the transition of the drive mode to the third drive mode. The occurrence of J1, J2, or J3 in the fourth drive mode indicates transition to the third drive mode. More specifically, this means that if an operation instruction by the drive mode switch 15 is to skip a drive mode, the coupling state of the differential is always changed sequentially between adjacent drive modes.

Figure 22:
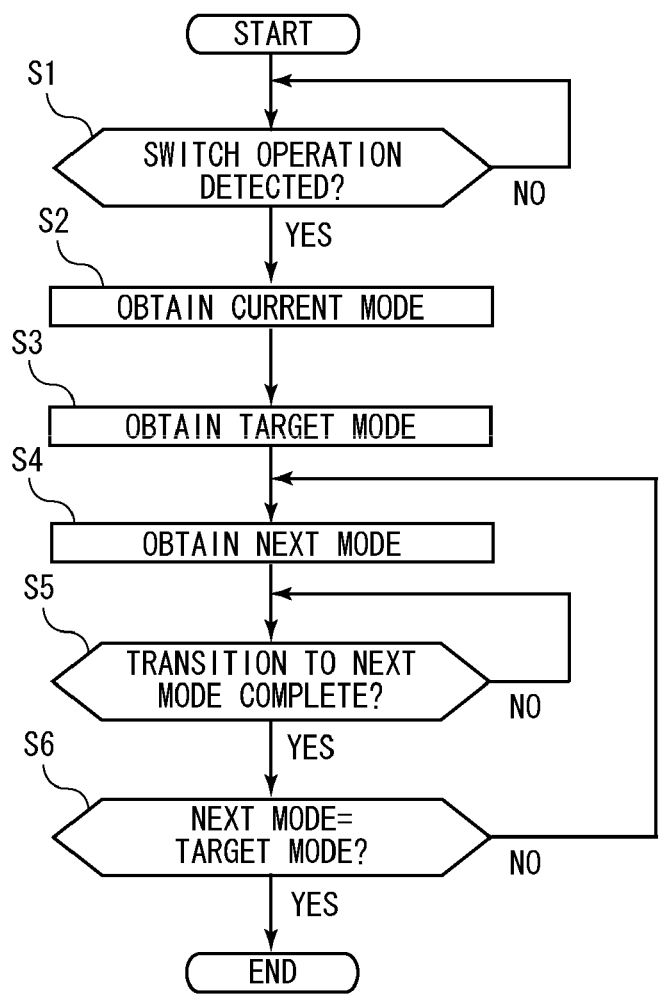
FIG. 22 is a flowchart related to control of changes between the drive modes.

FIG. 22 is a flowchart for illustrating control of drive mode changes. The flowchart in FIG. 22 shows control carried out in the ECU 16. The ECU 16 determines whether or not switch operation has been carried out by the drive mode switch 15 (step S1). If the switch operation is detected, the ECU 16 obtains the current mode (step S2). The current mode indicates the present drive mode. The ECU 16 obtains the current mode based on signals input at the terminals T5 to T7, T10 and T11.

The ECU 16 then obtains a target mode (step S3). The target mode is a drive mode requested by the driver. The ECU 16 obtains the target mode based on signals input at the terminals T13 and T14. When the drive mode switch 15 is changed over multiple positions, the final position of the drive mode switch 15 corresponds to the target mode.

The ECU 16 then obtains the next mode (step S4). The next mode is the mode to which the drive mode should be changed on the way to the target mode. The next mode is an adjacent mode to the current mode. Referring to FIG. 21, when the current mode is the second drive mode and the target mode is the fourth drive mode, the next mode is the third drive mode. When the current mode is the third drive mode and the target mode is the first drive mode, the next mode is the second drive mode.

The ECU 16 determines whether the transition to the next mode is complete (step S5). Until the transition to the next mode is complete, the drive mode indicator 73 flashes as shown in FIG. 20. When the transition to the next mode is complete, the ECU 16 determines whether the next mode matches the target mode (step S6). If the next mode matches the target mode, the transition of the drive mode is complete and therefore the processing ends. If the next mode does not match the target mode, the control returns to step S4 and the next mode is obtained. Then, the processing is repeated until the next mode matches the target mode.

As in the foregoing, according to the present preferred embodiment, the vehicle 1 preferably includes the front switch 45 arranged to switch the coupling state of the front differential 2 and the rear switch 57 arranged to switch the coupling state of the rear differential 3. The vehicle 1 also preferably includes the ECU 16 that is arranged and programmed to control the front switch 45 and the rear switch 57. The ECU 16 can switch the drive mode of the vehicle 1 among four drive modes, i.e., the first, second, third, and fourth drive modes. The ECU 16 allows transition only to the second drive mode from the first drive mode, only to the first or third drive mode from the second drive mode, only to the second or fourth drive mode from the third drive mode, and only to the third drive mode from the fourth drive mode. The driver can select a drive mode among various drive modes depending on the land form or the state of the road. Since the drive mode is switched to an adjacent drive mode sequentially, and therefore the switching operation of the differential can be carried out smoothly.

The vehicle 1 according to the present preferred embodiment preferably includes the drive mode switch 15. The drive mode switch 15 can move directly to the second position P2 from the first position P1, directly to the first position P1 or the third position P3 from the second position P2, directly to the second position P2 or the fourth position P4 from the third position P3, and directly to the third position P3 from the fourth position P4. The first to fourth positions P1 to P4 are arranged sequentially in the ascending order of the driving force (traction) of the wheels to the road surface. The drive mode switch 15 allows the drive mode to be switched only to an adjacent drive mode directly, so that comfortable driving is enabled.

According to the present preferred embodiment, the ECU 16 controls the front switch 45 to set the front differential 2 to a non-driven state and controls the rear switch 57 to set the rear differential 3 to a differential state or a differential locked state, so that the vehicle 1 is set to a two-wheel drive state. The ECU 16 controls the front switch 45 to set the front differential 2 to a differential state or a differential locked state and controls the rear switch 57 to set the rear differential 3 to a differential locked state, so that the vehicle 1 is set to a four-wheel driving state. The coupling states of the differentials can be controlled to switch between the two-wheel driving state and the four-wheel driving state.

The front differential 2 and the rear differential 3 each include an input gear, a ring gear, a pinion shaft, a pinion gear, a drive shaft, and left and right side gears. The differentials can be constructed using general purpose components.

The front switch 45 can set the front differential 2 to a non-driven state by separating the right front side gear 42 and the front drive shaft 6. The front switch 45 can set the front differential 2 to a differential state by coupling the right front side gear 42 and the front drive shaft 6. The front switch 45 can set the front differential 2 to a differential locked state by coupling the right front side gear 42 and the front drive shaft 6 to the front gear case 43 (or the front ring gear 38). The non-driven state, the differential state, and the differential locked state can be implemented by arranging coupling or separating of a small number of components.

The front actuator 47 releases the coupled state between the front side gear 42 and the front drive shaft 6 by sliding the front sleeve 46. The front differential 2 can be set to a non-driven state by releasing the coupled state. The front actuator 47 spline-couples the front side gear 42 and the front drive shaft 6 by sliding the front sleeve 46. The spline-coupling allows the front differential 2 to a differential state. The non-driven state and the differential state can be switched by the sliding movement of the front sleeve 46.

The front actuator 47 further slides the front sleeve 46 and spline-couples it with the front gear case 43 (or the front ring gear 38). The front differential 2 can be set to a differential locked state as the front sleeve 46 is spline-coupled with the front gear case 43. The sliding movement of the front sleeve 46 allows the differentials to be switched among the non-driven state, the differential state, and the differential locked state.

The sleeve and the actuator are used both to switch the differential 2 between the non-driven state and the differential state and to switch the differential between the differential state and the differential locked state. The number of components is thus reduced, so that the weight of the vehicle can be reduced.

The rear switch 57 can set the differential 3 to a differential state by separating the right rear side gear 54 and the rear gear case 55 (or the rear ring gear 50) from each other. The rear switch 57 can set the rear differential 3 to a differential locked state by coupling the right rear side gear 54 and the rear gear case 55 (or the rear ring gear 50) with each other. The differential state and the differential locked state can be implemented by arranging coupling and separating of a small number of components.

The rear actuator 59 switches the coupled and connected states between the rear side gear 54 and the rear side case 55 (or the rear ring gear 50) by sliding the rear sleeve 58. The sliding movement of the rear sleeve 54 allows switching between the differential state and the differential locked state.

The vehicle 1 according to the present preferred embodiment preferably includes the drive mode indicator 73 that indicates the coupling state between the front differential 2 and the rear differential 3.

According to the present preferred embodiment, the drive mode indicator 73 is provided in the meter panel 63 provided with the speedometer 65 and the like. The space for providing the drive mode indicator 73 can be secured easily, which makes it easy to visually recognize indicated contents.

The vehicle 1 according to the present preferred embodiment indicates the states corresponding to the first to fourth positions P1 to P4, respectively, of the front differential 2 and the rear differential 3. The driver can easily be aware of the coupling state of each differential.

According to the present preferred embodiment, the drive mode indicator 73 indicates the left and right front wheel marks 7a and 8a and the left and right rear wheel marks 12a and 13a. The drive mode indicator 73 indicates prescribed marks representing the differential state and differential locked state between the left and right front wheel marks 7a and 8a and between the left and right rear wheel marks 12a and 13a. The driver can immediately know the exact coupling state of each of the differentials.

The drive mode indicator 73 indicates the circles 73a and 73b and the crosses 73c and 73d between the left and right front wheel marks 7a and 8a or between the left and right rear wheel marks 12a and 13a in order to indicate the differential state and the differential locked state. The driver can immediately know the exact coupling state of each of the differentials.

The drive mode indicator 73 indicates no particular sign between the left and right front wheel marks 7a and 8a in order to indicate the non-driven state. The driver can immediately know the exact coupling state of the front differential.

The position signal A corresponding to a drive mode selected by the drive mode switch 15 is output to the ECU (drive mode controller) 16. The ECU 16 outputs the control signals B and C in response to the position signal A to the front differential 2 and the rear differential 3.

If each switching mechanism is directly controlled in response to a signal from the drive mode switch 15, the contact rating of the drive mode switch increases, so that the operation of the switch may become heavy accordingly. According to the present preferred embodiment, each of the switching mechanisms is controlled through the ECU 16, so that the operability of the drive mode switch 15 is high.

The ECU 16 used to control the engine operation state is also used as the drive mode controller, and therefore the control structure can be simplified.

According to the present preferred embodiment, the sleeve and the actuator used to switch between the non-driven state and the differential state are used also as the sleeve and the actuator to switch between the differential state and the differential locked state. Alternatively, these may be provided as separate components.

The two-wheel/four-wheel switching mechanism is not limited to the arrangement according to the above-described preferred embodiment. A two-wheel/four-wheel switching mechanism may be provided, for example, at the output shaft 9 of the engine 1. In this case, the front differential does not need a non-driven state and needs only be set to a differential state or a differential locked state.

Second Preferred Embodiment

Figure 23:
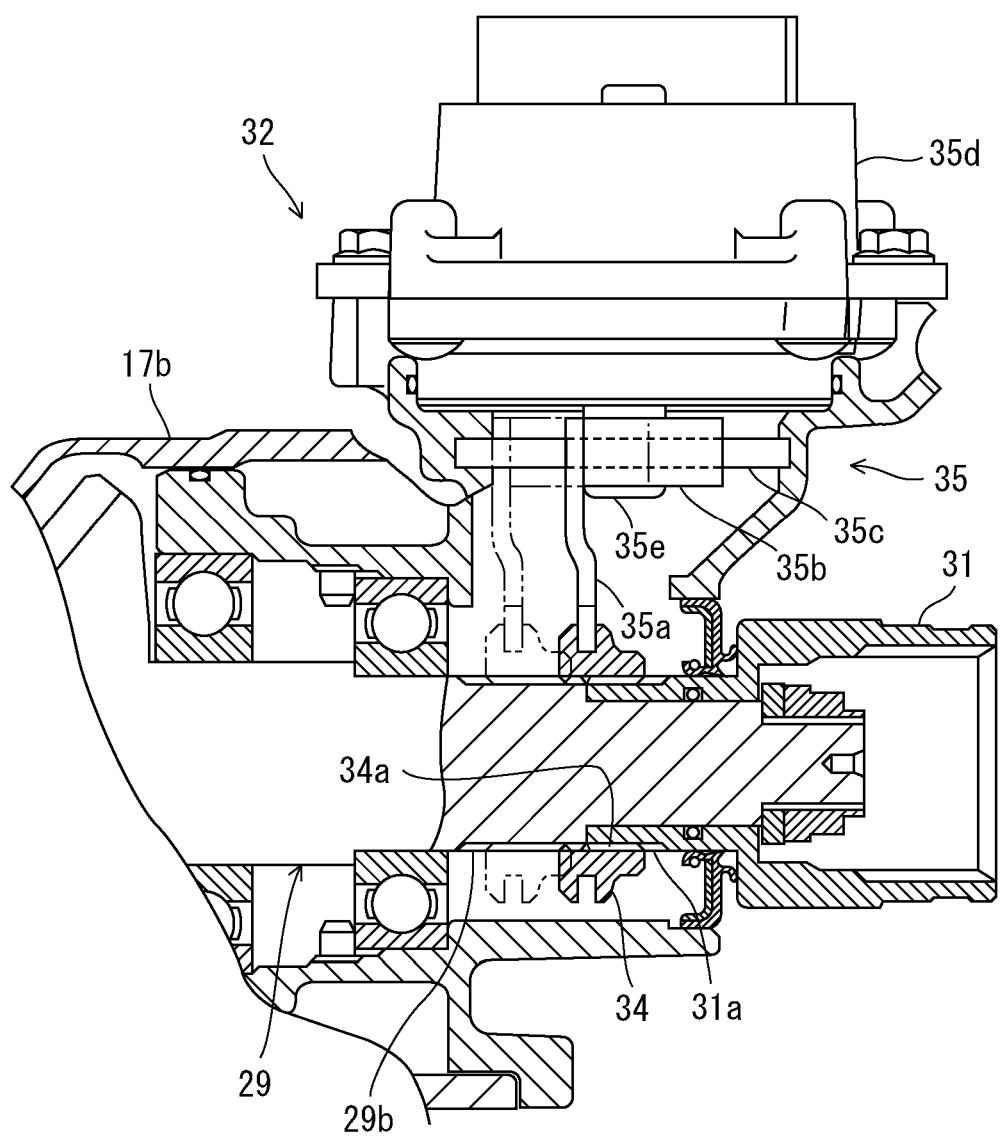
FIG. 23 is a sectional view of a two-wheel/four wheel switching mechanism according to a second preferred embodiment of the invention.

FIG. 23 is a view of a second preferred embodiment in which the output shaft of the engine is provided with a two-wheel/four-wheel switching mechanism 32. The two-wheel/four-wheel switching mechanism 32 transmits the driving force of the engine 1 to the front transmission shaft 4 and the rear transmission shaft 9, so that the vehicle is set to a four-wheel driving state. The two-wheel/four-wheel switching mechanism 32 shuts off the driving force of the engine to the front transmission shaft 4, so that the vehicle is set to a two-wheel driving state.

The joint member 31 is mounted at the front end of the output shaft 29 so that it can rotate relative thereto. A spline 29b is provided at the outer circumference of the output shaft 29. A spline 31a is provided at the outer circumference of the joint member 31. The splines 29b and 31a have the same diameter and the same pitch. A sleeve 34 is provided so that it can slide in the axial direction of the output shaft 29. A spline 34a that can be engaged with the splines 29b and 31a is provided at the inner circumference of the sleeve 34.

An actuator 35 that slides the sleeve 34 in the axial direction of the output shaft 29 is provided at the side portion of the sleeve 34. The actuator 35 has the following structure.

A driving lever 35a is attached to the sleeve 34. A worm gear 35b is fixed to the driving lever 35a. The worm gear 35b is supported slidably by a guide pin 35c. The worm gear 35b is engaged with a gear 35e provided at the output shaft of the motor 35d.

The motor 35d is driven to slide the sleeve 34 so that the sleeve 34 is engaged with both the spline 29b of the output shaft 29 and the spline 31a of the joint 31. The position of the sleeve 34 at the time is indicated by the solid line in FIG. 17. In this state, a four-wheel driving state is attained, in which the driving force of the engine is transmitted to both the front and rear wheels.

The motor 35d is driven to slide the sleeve 34 so that the sleeve 34 is engaged only with the spline 29b of the output shaft 29. The position of the sleeve 34 at the time is indicated by the double-chain line in FIG. 17. In this state, a two-wheel driving state is attained, in which the driving force of the engine is transmitted only to the rear wheels.

In the description of the first preferred embodiment, the drive mode switch 15 preferably is a rotary switch type, by way of illustration. The drive mode switch is not limited to this type.

Figure 24:
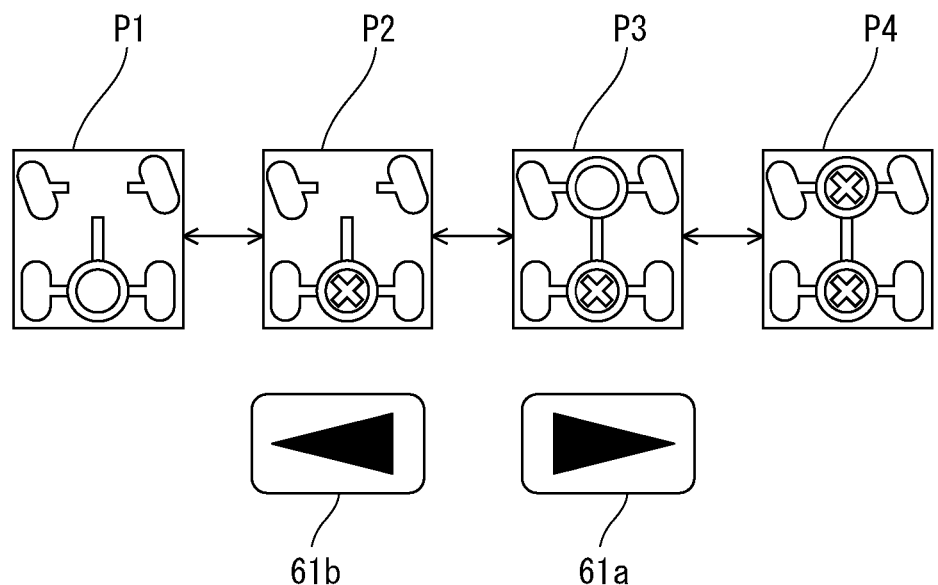
FIG. 24 is a view of a modification of the drive mode switch.
Figure 25:
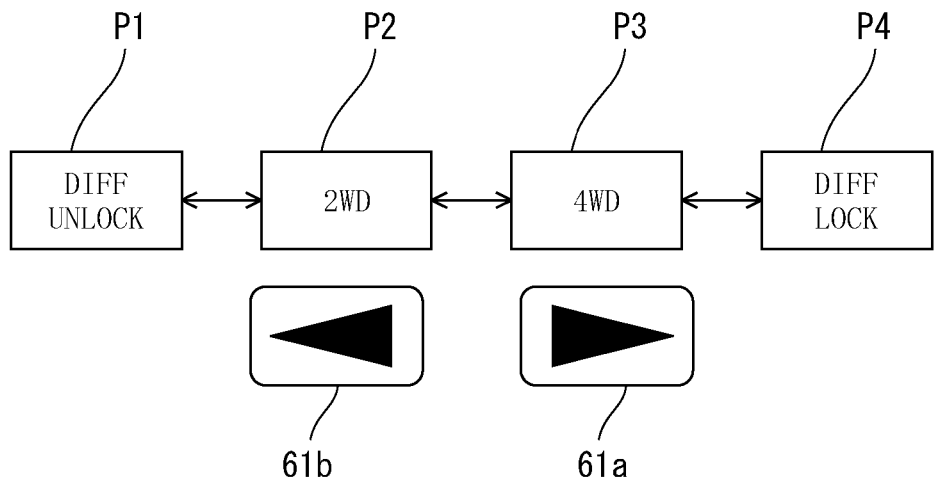
FIG. 25 is a view of another modification of the drive mode switch.

For example, as shown in FIGS. 24 and 25, the switch may include a forward button 61a and a return button 61b. When the present position is, for example, the first position P1, the drive mode is changed to the second position P2, the third position P3, the fourth position P4 and to the fourth position P4 sequentially one by one every time the forward button 61a is pressed. The drive mode is changed in the reverse direction when the return button 61b is pressed.

In the example shown in FIG. 24, the drive mode indicator 73 indicates the states of positions by the same marks as those used in the first preferred embodiment. In the example shown in FIG. 25, the drive mode indicator 73 indicates the states of positions in letters.

While preferred embodiments of the present invention have been described above, it is to be understood that variations and modification will be apparent to those skilled in the art without departing the scope and spirit of the present invention. The scope of the present invention, therefore, is to be determined solely by the following claims.

What is claimed is:

1. A vehicle comprising:
    a front differential arranged to transmit a driving force of an engine to left and right front wheels;
    a rear differential arranged to transmit the driving force of the engine to left and right rear wheels;
    a front switch arranged to switch a coupling state of the front differential;
    a rear switch arranged to switch a coupling state of the rear differential; and
    a controller arranged and programmed to control the front switch and the rear switch so as to switch the vehicle among first to fourth vehicle drive modes; wherein
    in the first drive mode, the controller controls the front switch to set the front differential to a non-driven state in which the driving force of the engine is not transmitted to the left and right front wheels and controls the rear switch to set the rear differential to a differential state in which the driving force of the engine is transmitted to the left and right rear wheels while a rotation speed difference between the left and right rear wheels is eliminated through adjustment;
    in the second drive mode, the controller controls the front switch to set the front differential to a non-driven state in which the driving force of the engine is not transmitted to the left and right front wheels and controls the rear switch to set the rear differential to a differential locked state in which the driving force of the engine is transmitted to the left and right rear wheels so that the left and right rear wheels rotate approximately at the same rotation speed;
    in the third drive mode, the controller controls the front switch to set the front differential to a differential state in which the driving force of the engine is transmitted to the left and right front wheels while the rotation speed difference between the left and right front wheels is eliminated through adjustment and controls the rear switch to set the rear differential to a differential locked state in which the driving force of the engine is transmitted to the left and right rear wheels so that the left and right rear wheels rotate approximately at the same rotation speed;
    in the fourth drive mode, the controller controls the front switch to set the front differential to a differential locked state in which the driving force of the engine is transmitted to the left and right front wheels so that the left and right front wheels rotate approximately at the same rotation speed and controls the rear switch to set the rear differential to a differential locked state in which the driving force of the engine is transmitted to the left and right rear wheels so that the left and right rear wheels rotate approximately at the same rotation speed;
    in the first drive mode, the controller only allows transition to the second drive mode, and not to the third and fourth drive modes;
    in the second drive mode, the controller only allows transition to the first or third drive modes, and not to the fourth drive mode;
    in the third drive mode, the controller only allows transition to the second or fourth drive modes, and not to the first drive mode; and
    in the fourth drive mode, the controller only allows transition to the third drive mode, and not to the first and second drive modes.

2. The vehicle according to claim 1, further comprising a drive mode switch arranged to switch the drive mode,
    the drive mode switch having first to fourth positions corresponding to the first to fourth drive modes, respectively,
    the drive mode switch being movable directly to the second position from the first position, directly to the first or third position from the second position, directly to the second or fourth position from the third position, and directly to the third position from the fourth position.

3. The vehicle according to claim 1, wherein the controller is arranged and programmed to control the front switch to set the front differential to a non-driven state and the rear switch to set the rear differential to a differential state or a differential locked state so that the vehicle is set to a two-wheel driving state, and
    the controller is arranged and programmed to control the front switch to set the front differential to a differential state or a differential locked state and the rear switch to set the rear differential to a differential locked state so that the vehicle is set to a four-wheel driving state.

4. The vehicle according to claim 1, wherein the front differential includes:
    a front input gear arranged to transmit the driving force of the engine;
    a front ring gear driven to rotate by the front input gear;
    a front pinion shaft arranged to rotate together with the front ring gear;
    a front pinion gear supported rotatably at the front pinion shaft;
    left and right front drive shafts arranged to transmit the driving force to the left and right front wheels; and
    left and right front side gears mounted at inner ends of the left and right front drive shafts in a vehicle width-wise direction and engaged with the front pinion gear.

5. The vehicle according to claim 4, wherein the front switch is arranged to set the front differential to a non-driven state by separating one of the left and right front side gears and the front drive shaft, to a differential state by coupling one of the left and right front side gears with the front drive shaft, and to a differential locked state by coupling one of the left and right front side gears and the front ring gear.

6. The vehicle according to claim 5, wherein the front switch includes a first front sleeve arranged to be movable in an axial direction of the front drive shaft so as to couple or separate one of the left and right front side gears and the front drive shaft; and
    a first front actuator arranged to move the first front sleeve in the axial direction of the front drive shaft.

7. The vehicle according to claim 6, wherein the front switch includes a second front sleeve arranged to be movable in the axial direction of the front drive shaft so as to couple or separate one of the left and right front side gears and the front ring gear; and
    a second front actuator arranged to move the second front sleeve in the axial direction of the front drive shaft.

8. The vehicle according to claim 7, wherein one sleeve defines both of the first and second front sleeves and one actuator defines both of the first and second front actuators.

9. The vehicle according to claim 1, wherein the rear differential includes:
    a rear input gear arranged to transmit the driving force from the engine;
    a rear ring gear driven to rotate by the rear input gear;
    a rear pinion shaft arranged to be rotated together with the rear ring gear;

a rear pinion gear supported rotatably at the rear pinion shaft;
left and right rear drive shafts arranged to transmit the driving force to the left and right rear wheels; and
left and right rear side gears mounted at inner ends of the left and right rear drive shafts in a vehicle width-wise direction and engaged with the rear pinion gear.

10. The vehicle according to claim 9, wherein the rear switch is arranged to set the rear differential to a differential state by separating one of the left and right rear side gears and the rear ring gear and to a differential locked state by coupling one of the left and right rear side gears with the rear ring gear.

11. The vehicle according to claim 10, wherein the rear switch includes a rear sleeve arranged to be movable in an axial direction of the rear drive shaft to couple or separate the rear side gear and the rear ring gear; and
a rear actuator arranged to move the rear sleeve in the axial direction of the rear drive shaft.

12. The vehicle according to claim 1, further comprising a drive mode indicator arranged to indicate the coupling states of the front differential and the rear differential.

13. The vehicle according to claim 12, wherein the drive mode indicator is provided in a meter panel including a speed indicator arranged to indicate a traveling speed of the vehicle.

14. The vehicle according to claim 12, wherein the drive mode indicator is arranged to indicate the states of the front differential and the rear differential corresponding to the first to fourth drive modes.

15. The vehicle according to claim 12, wherein the drive mode indicator includes:
a wheel indicator arranged to indicate left and right front wheel marks resembling a pair of left and right front wheels and left and right rear wheel marks resembling a pair of left and right rear wheels; and
a differential state indicator arranged to indicate the coupling states of the front differential and the rear differential by indicating a prescribed sign between the left and right front wheel marks and between the left and right rear wheel marks.

16. The vehicle according to claim 15, wherein the differential state indicator arranged to indicate a differential state of the front differential by indicating a first mark between the left and right front wheel marks, a differential state of the rear differential by indicating the first mark between the left and right rear wheel marks, a differential locked state of the front differential by indicating a second mark between the left and right front wheel marks, and a differential locked state of the rear differential by indicating the second mark between the left and right rear wheel marks.

17. The vehicle according to claim 16, wherein the first mark includes a circle and the second mark includes a cross.

18. The vehicle according to claim 16, wherein the differential state indicator is arranged to indicate the non-driven state of the front differential by indicating neither the first mark nor the second mark between the left and right front wheel marks.

19. The vehicle according to claim 1, further comprising a drive mode controller arranged and programmed to output a switch signal in response to a position signal by the drive mode switch to the front differential and the rear differential.

20. The vehicle according to claim 19, wherein the drive mode controller also defines an engine controller used to control an operation state of the engine.

* * * * *